US006652158B2

(12) United States Patent
Bartur et al.

(10) Patent No.: US 6,652,158 B2
(45) Date of Patent: Nov. 25, 2003

(54) OPTICAL NETWORKING UNIT EMPLOYING OPTIMIZED OPTICAL PACKAGING

(75) Inventors: Meir Bartur, Los Angeles, CA (US); Alfred Makonnen, Santa Monica, CA (US); Kerry Quinn, Nederland, CO (US)

(73) Assignee: Optical Zonu Corporation, Van Nuys, CA (US)

( * ) Notice: Subject to any disclaimer, the term of this patent is extended or adjusted under 35 U.S.C. 154(b) by 207 days.

(21) Appl. No.: 09/836,500

(22) Filed: Apr. 17, 2001

(65) Prior Publication Data

US 2002/0028049 A1 Mar. 7, 2002

Related U.S. Application Data

(60) Provisional application No. 60/230,132, filed on Sep. 5, 2000.

(51) Int. Cl.[7] ................................................. G02B 6/36
(52) U.S. Cl. .............................. 385/92; 385/88; 385/89; 385/91
(58) Field of Search ..................................... 385/88–94

(56) References Cited

U.S. PATENT DOCUMENTS

| 5,343,548 A | 8/1994 | Hall et al. |
| 5,867,622 A | 2/1999 | Miyasaka et al. |
| 6,282,351 B1 * | 8/2001 | Go et al. .................... 385/92 |
| 6,366,720 B1 * | 4/2002 | Shekel et al. ............... 385/33 |

FOREIGN PATENT DOCUMENTS

JP       403164706 A      7/1991

* cited by examiner

*Primary Examiner*—Hemang Sanghavi
(74) *Attorney, Agent, or Firm*—Myers Dawes Andras & Sherman

(57) ABSTRACT

An optical networking unit includes a plurality of optical components mounted on a substrate composed of a material transparent to radiation in a frequency range. At least one of the optical components is secured to the substrate by a curable bonding material of a type curable in response to exposure to radiation in said frequency range. One optical component preferably comprises an optical fiber secured to an optical fiber holder holding the optical fiber and secured to the substrate. An active optical component is optically aligned with the optical fiber and is secured to an active optical component holder holding the active optical component and secured to the substrate.

25 Claims, 17 Drawing Sheets

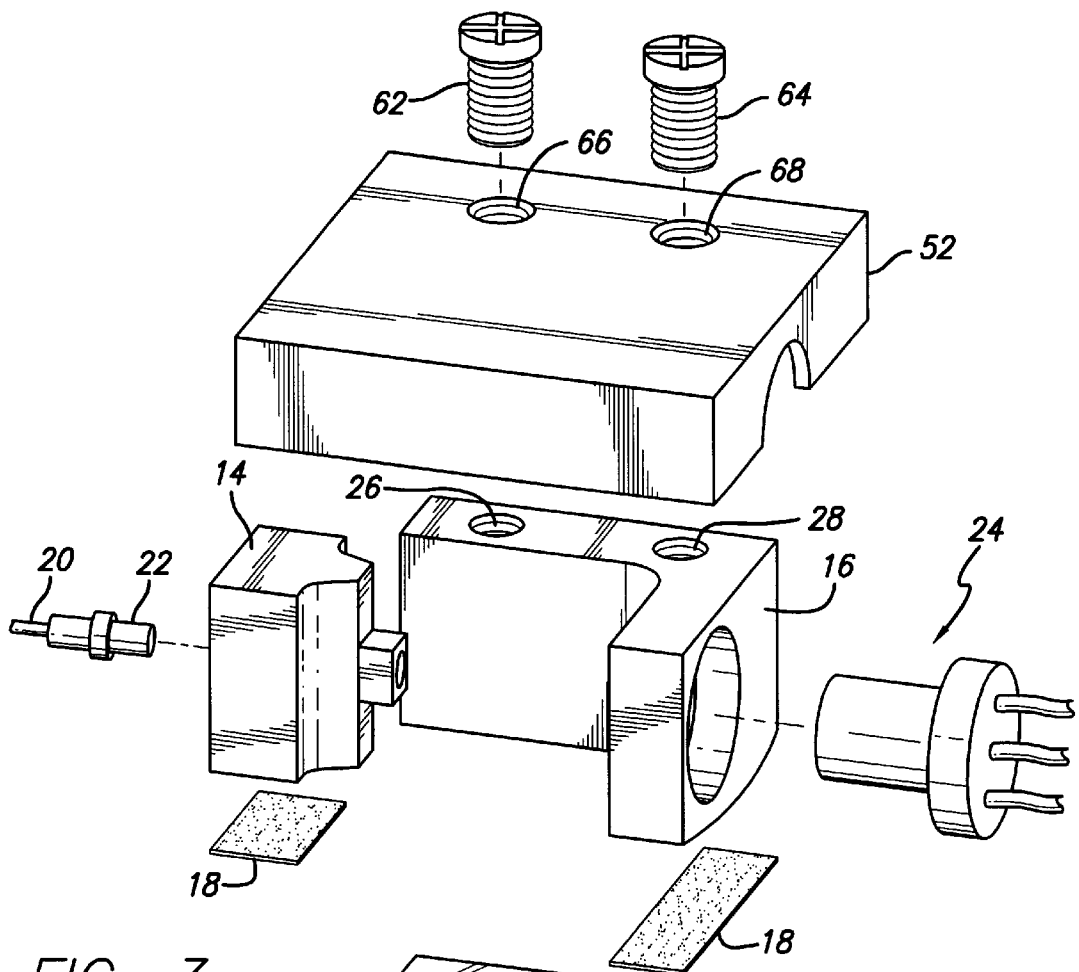
FIG. 3
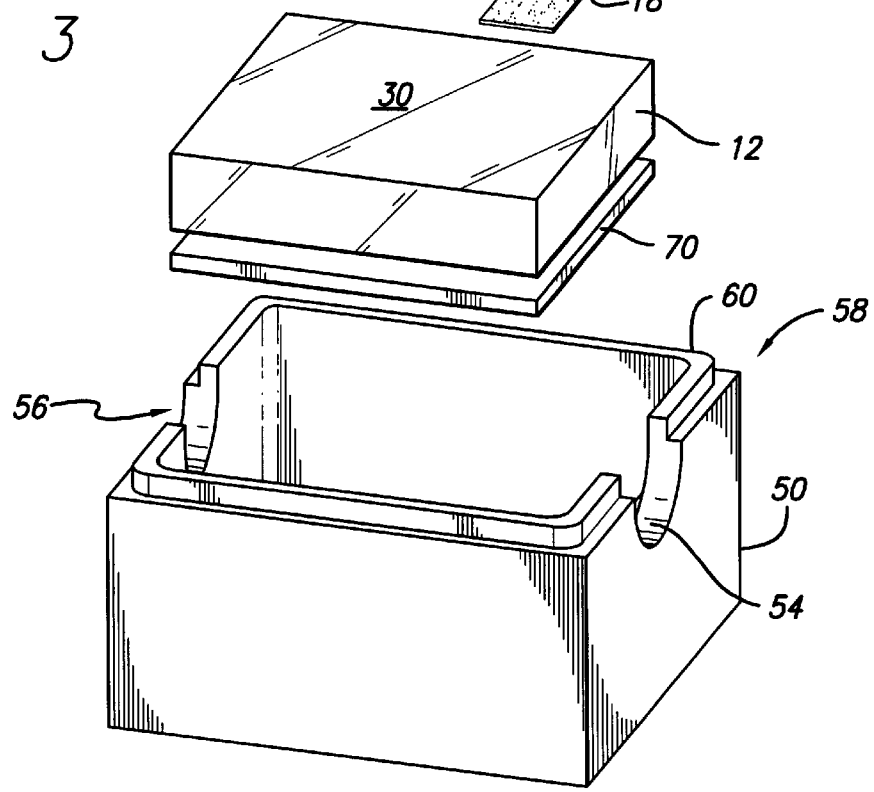

OPTICAL NETWORKING UNIT EMPLOYING OPTIMIZED OPTICAL PACKAGING

RELATED APPLICATION INFORMATION

The present application claims priority under 35 USC 119 (e) of provisional application Ser. No. 60/230,132 filed Sep. 5, 2000, the disclosure of which is incorporated herein by reference.

BACKGROUND OF THE INVENTION

1. Field of the Invention

The present invention relates to optical assemblies and systems and methods for optical packaging of optical components including diode lasers, optical fibers and optical detectors. More particularly, the present invention relates to optical networking units and optical packaging of optical components used in optical networking units.

2. Background of the Prior Art and Related Information

In various applications is necessary to package optical components, such as diode lasers, optical detectors, beam splitters and optical fibers, in compact optical packages while at the same time controlling the precise relationship of the optical elements. For example, one such application of significant commercial importance involves the optical systems employed in fiber optic data distribution networks. Such fiber optic data distribution networks are becoming increasingly important for the provision of high bandwidth data to commercial and residential locations as well as providing conventional voice and/or cable TV (CATV) signals. Such systems employ optical networking units of various types throughout the fiber optic distribution network.

For example, one type of optical networking unit may comprise a diode laser and an optical fiber configured in a package to allow data transmission from the laser into the optical fiber. To minimize losses of the laser light entering the fiber a precise relationship between the laser and the optical fiber must be provided and maintained. Another type of optical networking unit employed in the fiber optic distribution networks may employ an optical fiber aligned with an optical detector in a compact package. In this type of optical assembly it is also very important to ensure a precise relationship between the optical fiber and the detector to have accurate detection of the modulated light provided from the fiber. Other types of optical assemblies used in fiber optic distribution networks include combinations of diode lasers and detectors optically coupled to a fiber. Typically such combinations of detectors and lasers also require a beam splitter. Such beam splitter must also be properly aligned relative to the light beam path between the other optical elements. Other optical components may also be provided, for example, lenses and filters may also be combined in a single optical package comprising an optical networking unit.

Typically, the active optical components in an optical networking unit, such as the diode laser and photodetector are configured in standardized packages, such as transistor outline packages (TO can) which are generally cylindrical packages having leads extending from one side thereof. The optical fiber is typically provided in a ferrule which may be of standardized size and configuration for various network systems. The various passive components, i.e. lenses, filters and beam splitters, in turn may be provided in various configurations and/or packages. In all these cases, and with all these configurations of components, it is critically important that precise alignment is provided and maintained between the different optical elements in the optical assembly.

In addition to having precisely aligned components, optical networking units must be compact and relatively inexpensive to assemble. Since large numbers of such optical networking units are employed throughout a fiber optic distribution system, and since at various nodes or other points in the distribution system relatively large numbers of individual optical networking units may be combined at a single location, the combination of size and cost of the individual units may be very important to the effectiveness of the overall system. Clearly, however, as the optical package size is reduced it becomes more difficult to precisely align the optical elements and keep the cost of the unit low at the same time. Also, as fiber optics based data distribution approaches the consumer the requirement to reduce cost while maintaining precise tolerances in the optical elements included in the optical networking units pose the stringiest demands on the optical package construction and assembly.

In current approaches to packaging of optical components in optical networking units, a metal housing is provided with cylindrical holes used to receive the TO cans holding the various active optical components. A tightly aligned cylindrical hole is also typically provided for the optical fiber ferrule. The holes provided in the metal housing are typically given relatively loose tolerances to allow the optical components to be adjusted for more precise alignment during assembly. Once the components are more accurately aligned the components are fixed in place using various techniques such as laser welding, screw set plus epoxy, or epoxy only. This two-step process of first providing tolerance holes in a housing and then aligning and fixing the optical components is necessary since the parts vary slightly from one to another and the inaccuracies accumulated between the parts requires active alignment of the optical element in relationship with the fiber and also sufficiently accurate positioning of the holes in the housing is impractical for conventional machining or other metal processing in a cost effective manner. Also, even if the holes in the housing can be sufficiently accurately provided, nonetheless there is significant variation between batches of optical components and even individual optical components from a single batch. Therefore, a fixed alignment configuration in the housing cannot accommodate individual variations in the optical components. This two-step process is itself limited in accuracy, however, since it is difficult to maintain the orientation and alignment of the components during the fixing process. Also, this two-step approach introduces additional costs to the assembly process since it is poorly adapted to any type of automation.

Although this problem of providing a compact accurately aligned assembly of optical elements is particularly significant in the area of optical networking units due to the high degree of stability and precision placed on such units due to the placement accuracy requirements of modern single mode fiber optic data distribution systems, it will be appreciated that similar problems exist in a variety of other applications involving optical packaging of optical components.

Accordingly, it will be appreciated that a need presently exists for optical assemblies and systems and methods for optical packaging of optical elements including diode lasers, optical fibers, optical detectors, beam splitters, lens and filters, in a manner which provides a compact yet precisely aligned configuration. Furthermore, a need presently exists for such a system and method which can provide such a compact accurate configuration of optical components in a cost effective manner and which may be adapted for relatively high-volume production.

SUMMARY OF THE INVENTION

The present invention provides an optical networking unit employing an optimal packaging of optical components which provides both a compact configuration and a high degree of accuracy in the alignment of the various optical components. The present invention further provides a method for packaging optical components into such an optimized assembly in a manner which reduces the manufacturing costs and which is suitable for relatively high-volume production.

In a first aspect, a preferred embodiment of the present invention provides an optical networking unit comprising a substrate composed of a material transparent to radiation in a frequency range. An optical fiber holder is secured to the substrate and an optical fiber is secured to the optical fiber holder. An active optical component holder is also secured to the substrate and an active optical component, optically aligned with said optical fiber, is secured to the active optical component holder. At least one of the optical fiber holder and active optical component holder is secured to the substrate by a curable bonding material of a type curable in response to exposure to radiation in the frequency range. For example, the bonding material may be a UV curable adhesive and the substrate composed of a material transparent to UV radiation. In one preferred embodiment, the active optical component comprises a diode laser. In another preferred embodiment, the active optical component comprises a photodetector.

In a further aspect of the present invention, additional active optical components may be provided in the optical networking unit. For example, a photodetector may be provided as a second active optical component to detect modulated light provided from the optical fiber. Such detection may be provided along with the transmission of modulated light to the fiber if the first active optical component is a laser. Alternatively, detection of two different wavelengths of modulated light may be provided by the optical networking unit if the first active optical component is also a photodetector. Alternatively, emission of two different wavelengths of modulated light may be provided by the optical networking unit if the first and second active optical component are lasers of different wavelength. The additional active optical component may also be secured to a holder which is bonded to the substrate by a radiation curable adhesive. Passive optical components may also be provided, such as beam splitters, lenses, optical isolators, prisms, and filters. These may be secured to the optical fiber holder, active optical component holder, or directly to the substrate.

A third active optical component may also be provided in another aspect of the invention, which component may also be a photodetector in a preferred embodiment. This aspect of the invention may provide detection of two wavelengths of light from the optical fiber and transmission of a third wavelength to the fiber by the laser. Alternatively, detection of three different wavelengths may be provided.

In a further aspect the present invention provides a method of assembling optical components into an optical assembly. In a preferred embodiment the method comprises providing a first optical component and a second optical component and aligning the first and second optical components in a desired optical configuration. A transparent substrate is also provided. The first and second optical components are secured to the substrate in their aligned configuration by exposing a radiation curable bonding material through the substrate while maintaining the relative configuration of the optical components. For example, UV light and a UV curable adhesive may be employed.

Preferably the act of aligning comprises monitoring the output of at least one of the optical components while adjusting the relative configuration of the components to optimize the optical coupling of the components. The method may further comprise mounting the first optical component to a first optical component holder and the second optical component to a second optical component holder.

The act of securing may then comprise securing the optical component holders to the substrate.

In yet a further aspect the present invention provides an optical assembly comprising plural optical components secured to a substrate, wherein at least one of the components is secured to the substrate with a radiation curable bonding material.

Further features and advantages of the present invention will be appreciated by review of the following detailed description of the present invention.

BRIEF DESCRIPTION OF THE DRAWINGS

FIG. 3 is an exploded view of the optical assembly of FIG. 1 configured in a housing.

DETAILED DESCRIPTION OF THE INVENTION

Referring to FIGS. 1 and 2A–2E an optical assembly in accordance with a first preferred embodiment of the present invention is illustrated in perspective and component views, respectively. The optical assembly illustrated is a configuration employing optical components and alignment suitable for an application in a fiber optic distribution network and will also be referred to herein as an optical networking unit. It should be appreciated, however, that the optical assembly and the method of packaging optical components of the present invention may be employed in other applications and with other optical components and configurations than those described therein or below. Therefore, the present invention is not limited to optical networking units, although such provide one preferred embodiment of the present invention.

Figure 1:
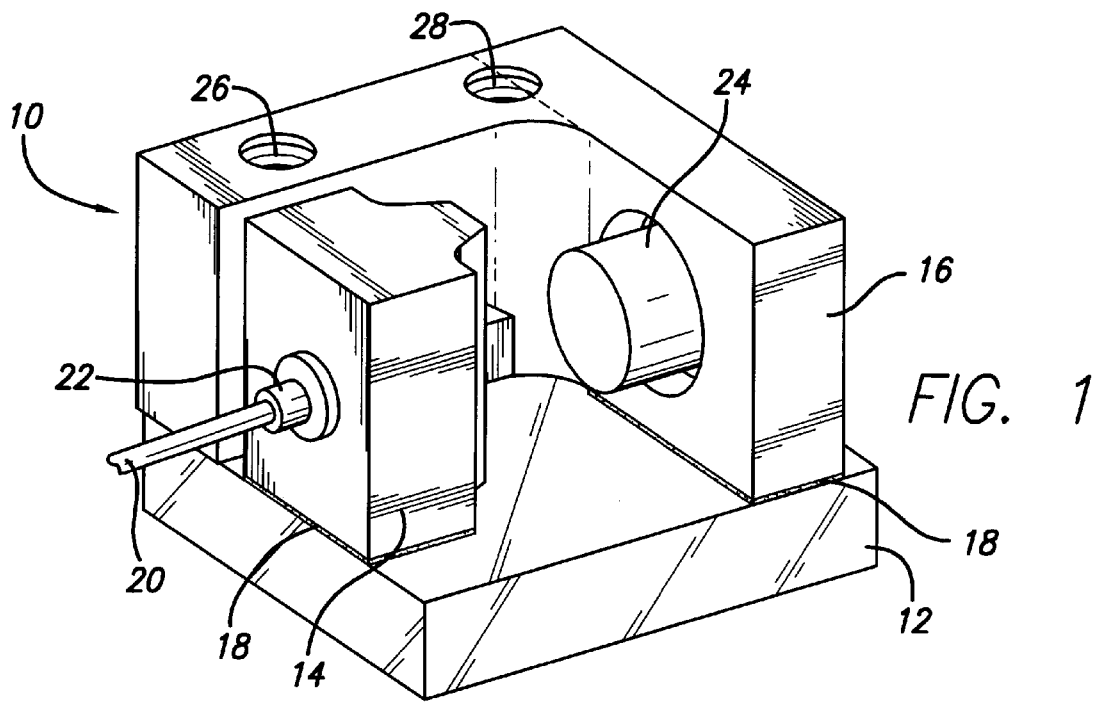
FIG. 1 is a perspective view of an optical assembly in accordance with a first preferred embodiment of the present invention.

Referring first to FIG. 1, optical assembly 10 is illustrated in a perspective view. The embodiment of FIG. 1 is an implementation employing two optical components, however, as will be described in relation to subsequent figures, the optical assembly and optical packaging method of the present invention may be employed for additional numbers of optical components, both passive and active in nature. As shown in FIG. 1, the optical components are mounted on a substrate 12 via optical component holders 14 and 16, respectively. The substrate 12 is composed of a rigid transparent material which allows a desired wavelength of radiation to pass through. As will be discussed in more detail below this allows a radiation curing adhesive 18 to be used to affix the optical component holders to the substrate 12. In a presently preferred embodiment a UV curing adhesive is employed for the adhesive 18 and substrate 12 is transparent to UV light. In particular, a suitable UV curable adhesive is Optocast 3400 epoxy and the corresponding wavelength of radiation is about 325 nm. Also, the substrate preferably has a relatively low coefficient of thermal expansion. One example of a suitable material for substrate 12 is borosilicate glass. Other suitable rigid transparent materials may also be employed for transparent substrate 12, however.

Still referring to FIG. 1, the illustrated optical components mounted in respective optical component holders 14, 16, are an optical fiber 20 terminated in an optical fiber holder, sleeve, capillary tube, or ferrule 22 and an active optical component 24. The optical component 24 is illustrated configured in a cylindrical package which may be a conventional cylindrical transistor outline (TO) package or "TO can". The optical component 24 may be a laser diode, optical detector such as a diode photodetector, or other active optical component adapted for the particular application. The active component may also incorporate electrical circuitry or devices in a common package; for example, built-in amplification circuitry in the case of a detector or modulation circuitry in the case of a laser diode or other light source. The optical component holders 14 and 16 are dimensioned so that the optical components are optically aligned, i.e., the holders are dimensioned such that the nominal optical axis of each of the components is configured the same distance above the top surface of the substrate 12. The optical component holders 14 and 16 may be composed of a suitable rigid material, such as a metal. For example brass is one example of a suitable metal which might be employed for holders 14 and 16. Preferably, both the holders 14 and 16 are composed of materials of relatively low, and closely matched, coefficients of thermal expansion to that of substrate 12 so that temperature variations will not cause the relative alignment of the components to change.

The optical component holder 16 is illustrated in FIG. 1 as having an L-shape with two mounting holes 26 and 28 which receive mounting members such as a screw. As will be described below in relation to FIG. 3, these are employed to mount the assembly to a housing and/or to a circuit board and also to thermally couple the component holder 16 to the housing to allow heat dissipation if the active component 24 is a significant heat generating component such as a laser diode or a photodetector with built-in amplifier such as a cable TV amplifier or a PIN-TIA photodetector (photodetector with built-in Trans Impedance Amplifier). In various applications, however, such as where mounting to a housing or circuit board is not required or where the active optical component 24 is not a heat generating component, the mounting holes 26 and 28 and the portion of the L-shape of component holder 16 containing the holes may be dispensed with. The resultant shape of component holder 16 is illustrated by the dashed line in FIG. 1, i.e., a simple rectangular block shape may be employed. Various other configurations and shapes of the optical component holder 16 and also optical component holder 14, geared to facilitate mounting to external package or a housing, special features that enable gripping and holding during manufacturing and other features are also possible, however.

Figure 2A:
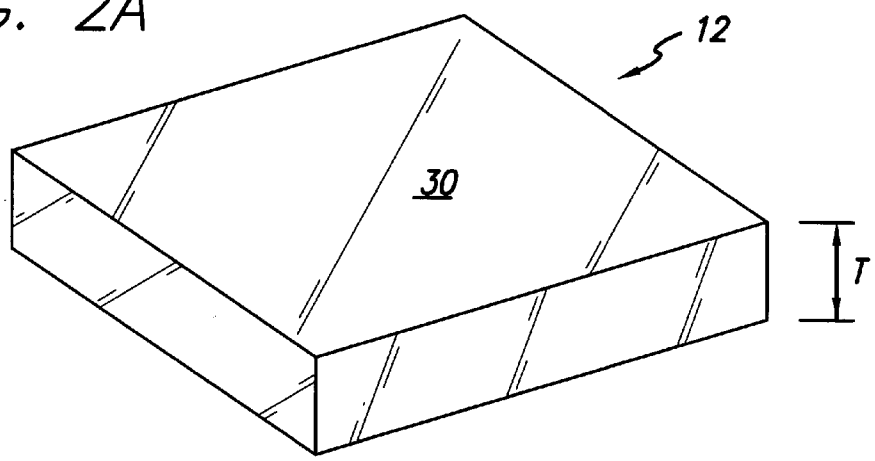
FIGS. 2A–2E are perspective views of the various components of the optical assembly of FIG. 1.

Referring to FIGS. 2A–2E the various components of the optical assembly 10 are illustrated in individual views. Referring first to FIG. 2A, the substrate 12 is illustrated in a perspective view. As shown, the top surface 30 of the substrate 12 is preferably a flat surface to facilitate the alignment of the optical component holders and optical components relative to the substrate and even bonding to the substrate. The substrate 12 has a thickness T sufficient to provide structural rigidity to the overall assembly. For example, for a substrate material composed of glass a thickness of 50–200 mils may be suitable. Although the substrate 12 is illustrated with a rectangular geometry in FIG. 2A, it should be appreciated that other geometries are also possible, for example, a cylindrical or other regular shape may be suitably employed. The top surface 30 of the substrate 12 may be textured or roughened to enable an improved adhesive bond while maintaining transperancy to the curing radiation.

Figure 2B:
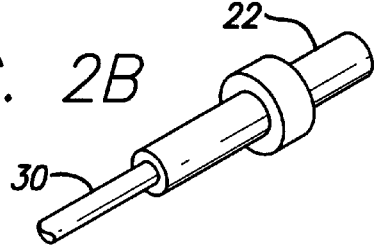
Figure 2D:
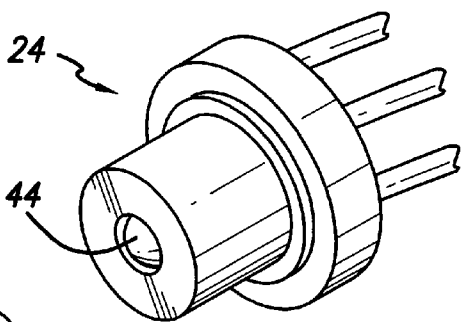
Figure 2C:
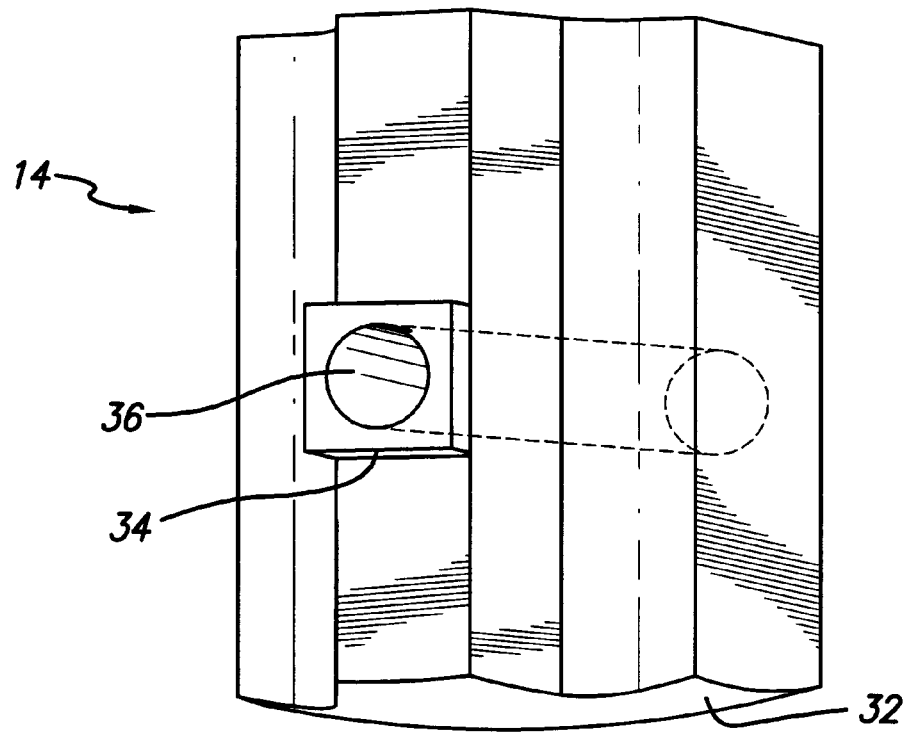

Referring to FIGS. 2B and 2C, respectively, the optical fiber and ferrule and the optical fiber holder are illustrated in perspective views. The optical fiber 20 and ferrule 22 may be conventional and the assembly of the present invention is preferably adapted to work with standardized optical fiber components. Therefore, the ferrule illustrated in FIG. 2B may have a simple generally cylindrical configuration and the fiber holder 14 has a matching suitable opening 36. However, various other fiber and/or ferrule configurations may be employed and optical fiber holder 14 will be modified accordingly. Also, the assembly of the present invention can work with various ferrule materials, for example, ferrule 22 may be composed of glass, ceramic, metal or plastic. The tip of the fiber maybe extended from its sleeve or ferrule holder, angle polished or cleaved to reduce reflections with or without antireflection coating. Polishing the fiber tip after its insertion and securing in the holder 14 provides means for precise relationship of the angle polish plane to the holder. The diameter of the opening 36 in the optical fiber holder 14 substantially corresponds to the diameter of the tip of ferrule 22 and has a slight taper in the case of a press fit mounting or slightly larger than the diameter of ferrule 22 in the case of an adhesive bonding between the ferrule and holder 14. The end of the opening 36 facing the active optical component 24 may be formed in an extension 34 from the body of the holder 14. This allows the end of the optical fiber facing the active component 24 to be more readily spaced close to the active component thereby increasing the optical coupling between the two optical components. The extension 34 can also be used during polishing of the fiber tip and/or used for securing additional components as will be explained later.

The bottom surface 32 of the optical fiber holder 14 is adapted to contact the flat surface 30 of the substrate 12 in a manner which will allow precise alignment of the optical fiber with the active component 24 and even bonding forces when the adhesive is cured. Therefore, the bottom surface 32 is either preferably flat or slightly curved with a slight curve illustrated in FIG. 2C. As will be explained in more detail in relation to one of the preferred method of assembly of the present invention, such a slight curvature allows a slight movement during alignment from a perfectly perpendicular orientation relative to the substrate while still ensuring solid contact with the substrate and even bonding with the adhesive bonding material. The bonding surface 32 of the holder 14 may be textured or roughened to enable an improved adhesive bond.

Although the specific configuration of the optical fiber holder 14 is relatively simple in shape and easy to fabricate and therefore may be advantageously employed, it will be appreciated that such configuration is only one example of a suitable embodiment and a variety of other shapes and configurations for such holder 14 may be employed while remaining within the scope of the present invention. The shape of the holder 14 is also appropriate for mounting into a polishing jig during its fabrication and held into a gripper or mounting platform during alignment as will be explained later.

Figure 2E:
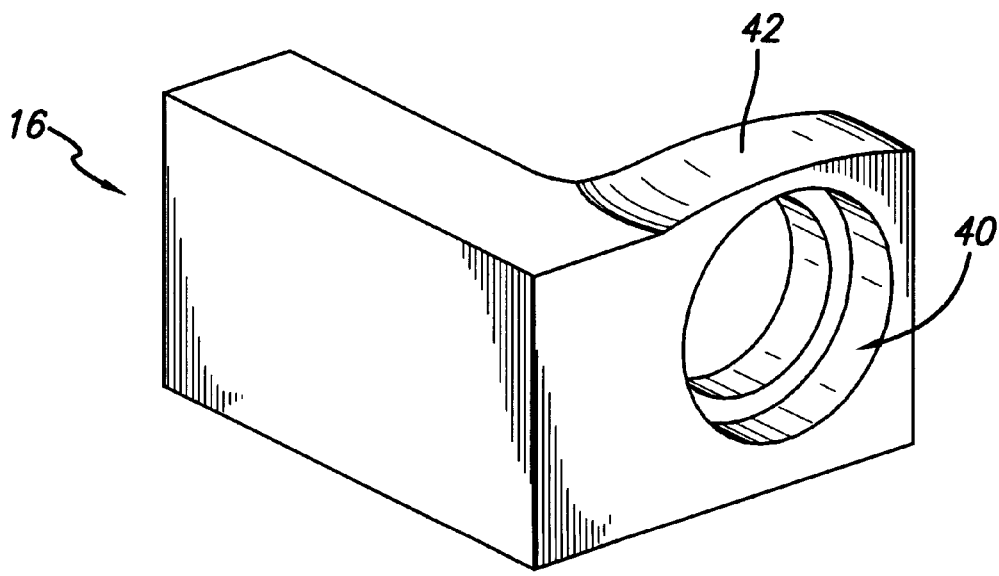

Referring to FIGS. 2D and 2E, the active optical component 24 and optical component holder 16 are illustrated in front and bottom perspective views respectively. Active optical component 24 is illustrated in a simple cylindrical shape, which may correspond to a TO can package, and holder 16 has a matching opening 40. Although TO can packages are conventionally employed for many active optical components, various other configurations may be employed for the active optical component and/or it's package and active optical component holder 16 will be modified accordingly. Also, while the component 24 is typically packaged in a metal can the optical component may be composed of various other materials, for example, glass, ceramic, or plastic. A lens 44 of suitable type may also be provided as schematically illustrated. For example, an aspheric, GRIN or ball lens may be provided as part of the active device 24. The diameter of the opening 40 in the active optical component holder 16 substantially corresponds to the diameter of component 24 in the case of a press fit mounting or slightly larger than the diameter of component 24 in the case of an adhesive, welding or other bonding between the component 24 and holder 16.

Some or all of the bottom surface 42 of the active optical component holder 14 is adapted to contact the flat surface 30 of the substrate 12 in a manner which will allow precise alignment of the optical fiber with the active component 24 and even bonding to the substrate. Therefore, the bottom surface 42 is either preferably flat or slightly curved, with a slight curve on a portion of the bottom surface illustrated in FIG. 2E. As will be explained in more detail in relation to the preferred method of assembly of the present invention, such a slight curvature allows a slight movement during alignment from a perfectly perpendicular orientation relative to the substrate while still ensuring solid contact with the substrate and even bonding with the adhesive bonding material. The bonding surface 42 of the active component 24 may be textured or roughened to enable an improved adhesive bond.

Although the embodiment of FIG. 1 has been illustrated with an optical fiber and an active optical component such as a laser diode or a photodetector, it should be appreciated that other optical components may equally be provided in an optical assembly such illustrated in FIG. 1.

Referring to FIG. 3, an exploded view of the optical assembly of FIG. 1 configured in a housing is illustrated. The components of the optical assembly correspond to those described in relation to FIGS. 1 and 2 and like numerals are used in FIG. 3. The illustrated embodiment of the housing includes bottom and top sections 50, 52, respectively. The two sections 50 and 52 mate to form a substantially sealed enclosure with the leads for active optical component 24 extending from a first opening 54 and with the optical fiber 20 extending from a second opening 56. The top and bottom sections 50 and 52 mate together along a mating surface 58 which may include a mating ridge 60 or other means for securely engaging the top and bottom sections. Various techniques to secure the two sections together may be employed such as a bonding material, screws, press fitting or other well-known fastening techniques. As further illustrated in FIG. 3, the active optical component holder 16 is coupled to the top section 52 via screws 62 and 64 which engage mounting holes 26 and 28 in holder 16 and matching holes 66 and 68 in the top section 52. Use of screws 62 and 64 to couple the active optical component holder 16 to the top section 52 are preferably employed where a good thermal contact between the two structures is desired thereby allowing heat generated by the active optical component 24 to be dissipated through the housing. To facilitate such thermal contact and heat dissipation the housing material is preferably chosen to have a good thermal conductivity and for example may be a suitable metal. The elongated portion of the L-shaped structure of holder 16 also increases the contact area between the active optical component holder 16 and housing thereby further enhancing heat transfer into housing for dissipation into the air. If necessary for the particular application and the particular active optical component 24 employed, additional heat dissipation means may be provided. For example, a heat sink may be coupled to the exterior surface of the housing or directly to the active optical component 24 so as to extend from the housing to provide a larger surface for heat dissipation. Also, in an alternate embodiment optical component holder 16 and top section 52 of the housing may be combined in a single piece. Alternatively, where heat dissipation is not important the housing need not be composed of a metal or other good thermal conductor and a more inexpensive or easily molded material such as a plastic may be employed.

The screws 62 and 64 may also be used to couple the assembly to a circuit board or other suitable mounting structure. The direct coupling to the component holder 16 through the screws 62 and 64 securely mounts the optics to the circuit board or other mounting surface. Vibration into the optics assembly may be further reduced by providing a cushioning layer 70 between the substrate 12 and the bottom section 50 of the housing. For example, layer 70 may be a caulking material, layer of rubber, or any other suitable cushioning material which may be easily introduced in manufacturing and assembly of the housing. The opening in the complete assembly where the fiber and the leads of the active components extend outside may be sealed with an appropriate silicone rubber.

While a simple two-piece rectangular package is illustrated in FIG. 3 for the combined optics assembly 10 and housing, it will be appreciated that various other configurations may also be provided. Therefore, the present invention should not in any way be limited to the particular configuration or geometry illustrated in FIG. 3 and a variety of different housing structures and means of coupling to the optics assembly may be provided while remaining within the spirit and scope of the present invention.

Figure 4A:
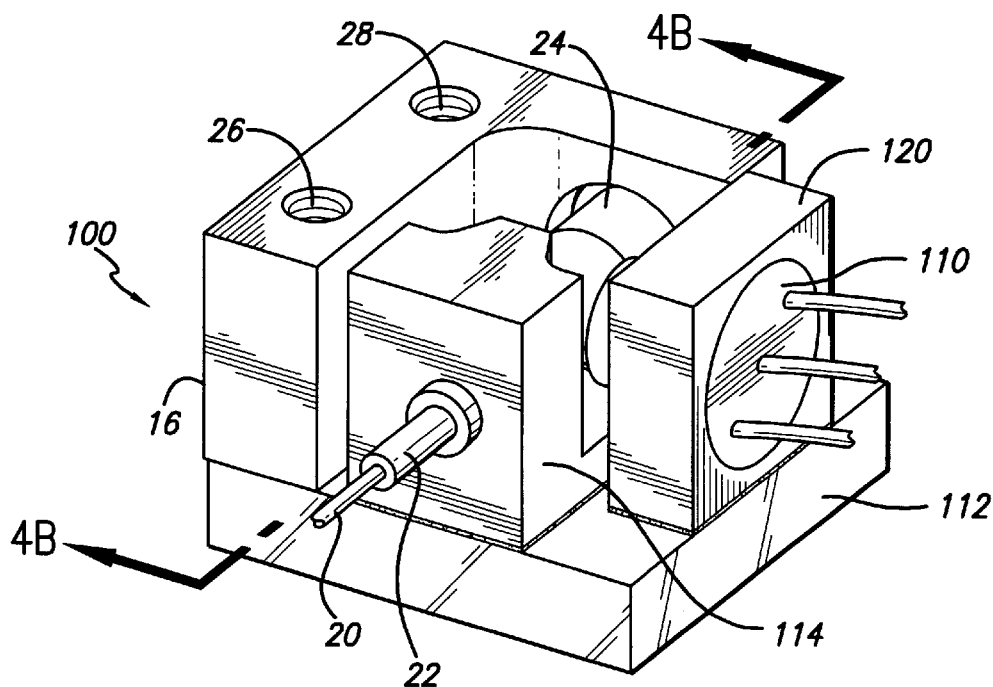
FIGS. 4A and 4B are perspective and sectional views, respectively, of an optical assembly in accordance with a second preferred embodiment of the present invention.
Figure 4B:
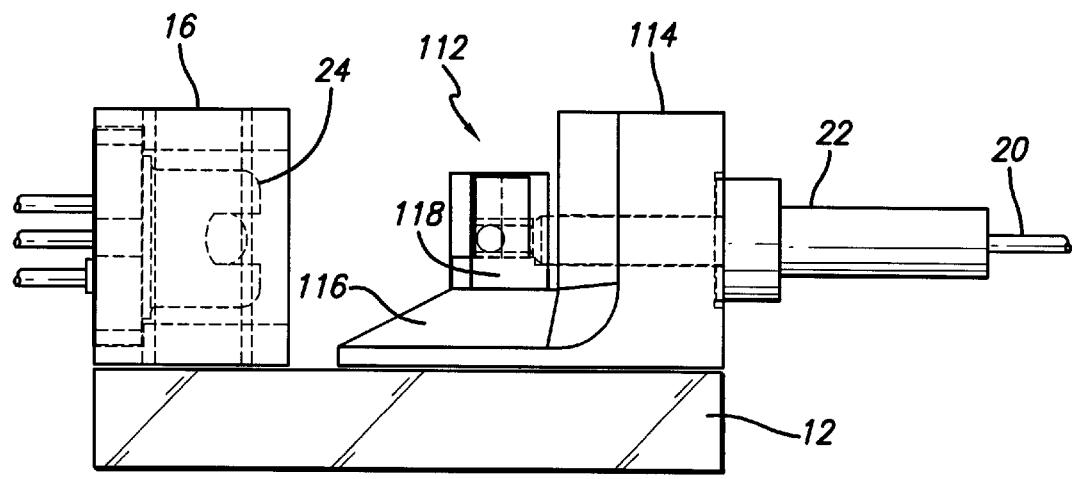

Referring to FIGS. 4A and 4B, a second preferred embodiment 100 of the optical assembly of the present invention is illustrated in perspective and side sectional views, respectively. The illustrated embodiment 100 adds an additional active optical component 110 along with passive optics 112 to the embodiment of FIG. 1. However, some of the components of the embodiment 100 may correspond to those described above in relation to FIG. 1 and like numerals are used for such common components.

More specifically, the embodiment 100 preferably comprises transparent substrate 12 to which are mounted the optical components via a radiation curable adhesive, as in the case of the previously described embodiment. Similarly, the optical component 24 and optical component holder 16 may be as described above in relation to the embodiment of FIG. 1. The added optical component 110 may preferably be any of a variety of known active optical components such as of the type described above in relation to active optical component 24. As examples, and without limitation, active optical component 110 may comprise a photodetector, a photodetector and built-in amplifier combination, such as a combined photodetector and cable TV amplifier or PIN-TIA combination, or other known active optical component. Also for convenience of manufacturing and assembly with commercially available components, the second active optical component 110 may preferably be provided in a conventional package such as a cylindrical TO can and the optical component holder 120 is preferably configured with an opening adapted to receive such a conventional component. The component holder 120 is dimensioned so as to place the second active optical component 110 at the correct distance from the substrate 12 so as to be optically aligned with the optical axes of the optical fiber 20 and the first active optical component 24. If the second active optical component 110 is a significant heat generating component, then the holder 120 is preferably a good thermal conductor such as brass and may be provided with mounting holes similar to holes 26 and 28 to thermally couple the holder 120 to a heat sink as described in relation to the holder 16 in the previously described embodiment. Also, for reasons described previously, holder 120 preferably has a relatively low coefficient of thermal expansion which also substantially matches that of substrate 12 and holders 16 and 114. Furthermore, it will be appreciated that the holder 120 is preferably affixed to the substrate 12 by the use of a radiation curable adhesive 18; for example, a UV curable adhesive as described previously may be employed, and has a flat or slightly curved lower surface for contacting the flat upper surface of substrate 12.

The optical fiber holder 114 of the embodiment 100 may preferably be modified from the previously described optical fiber holder by the provision of a platform or extension 116 for receiving the passive optics 112. The passive optics 112 may be configured in a passive optics holder 118 which is mounted on a flat upper surface of platform 116. One suitable embodiment of such a passive optics holder 118 will be described below in relation to FIG. 7. As will be described below in relation to FIGS. 8 and 9, passive optics 112 may include a beam splitter and one or more or filters, to allow the optical path of the light beam to be provided to both the first and second active optical components 24 and 110 as well as the fiber. Alternatively, the passive optics 112 may be mounted directly onto the flat surface of platform 116. Either approach allows passive optics 112 to be preconfigured relative to the optical fiber 20 and ferrule 22 prior to assembly of the component holder 114 onto the substrate 12. However, it should be appreciated that the passive optics holder 118 may alternatively be assembled directly onto substrate 12 in which case a radiation curable adhesive may be employed to adhere such holder to the substrate as in the case of the other optical component holders. In such case, the extension 116 of the optical fiber holder 114 may be dispensed with.

Figure 5A:
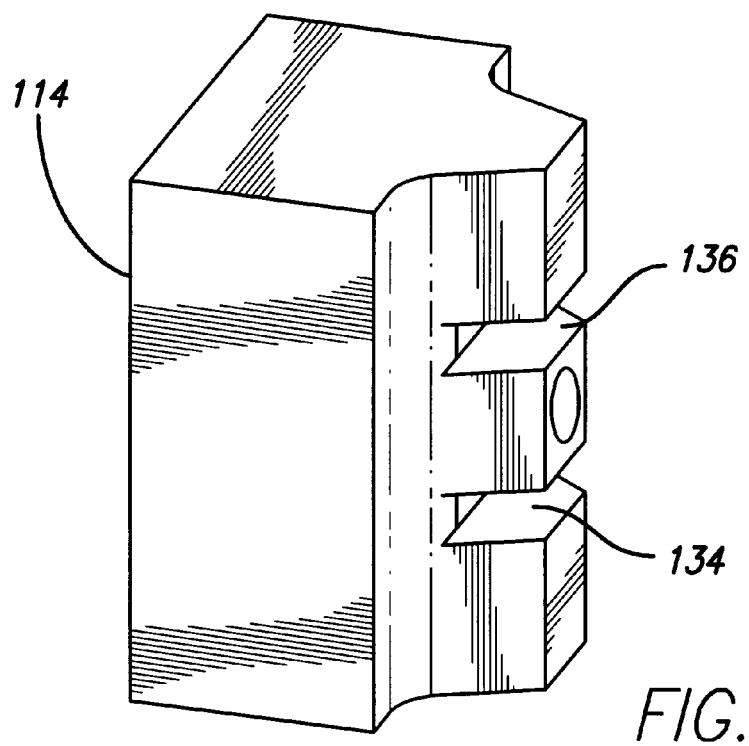
FIGS. 5A and 5B are perspective views of a fiber optic holder and passive optics holder in accordance with an alternate embodiment of the present invention.
Figure 5B:
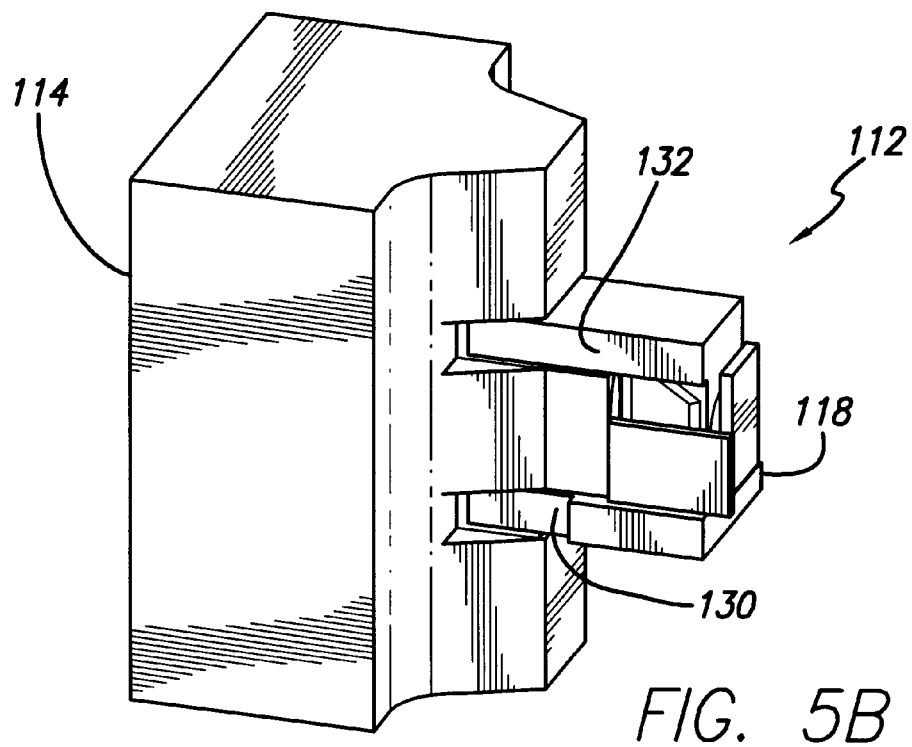
Figure 6A:
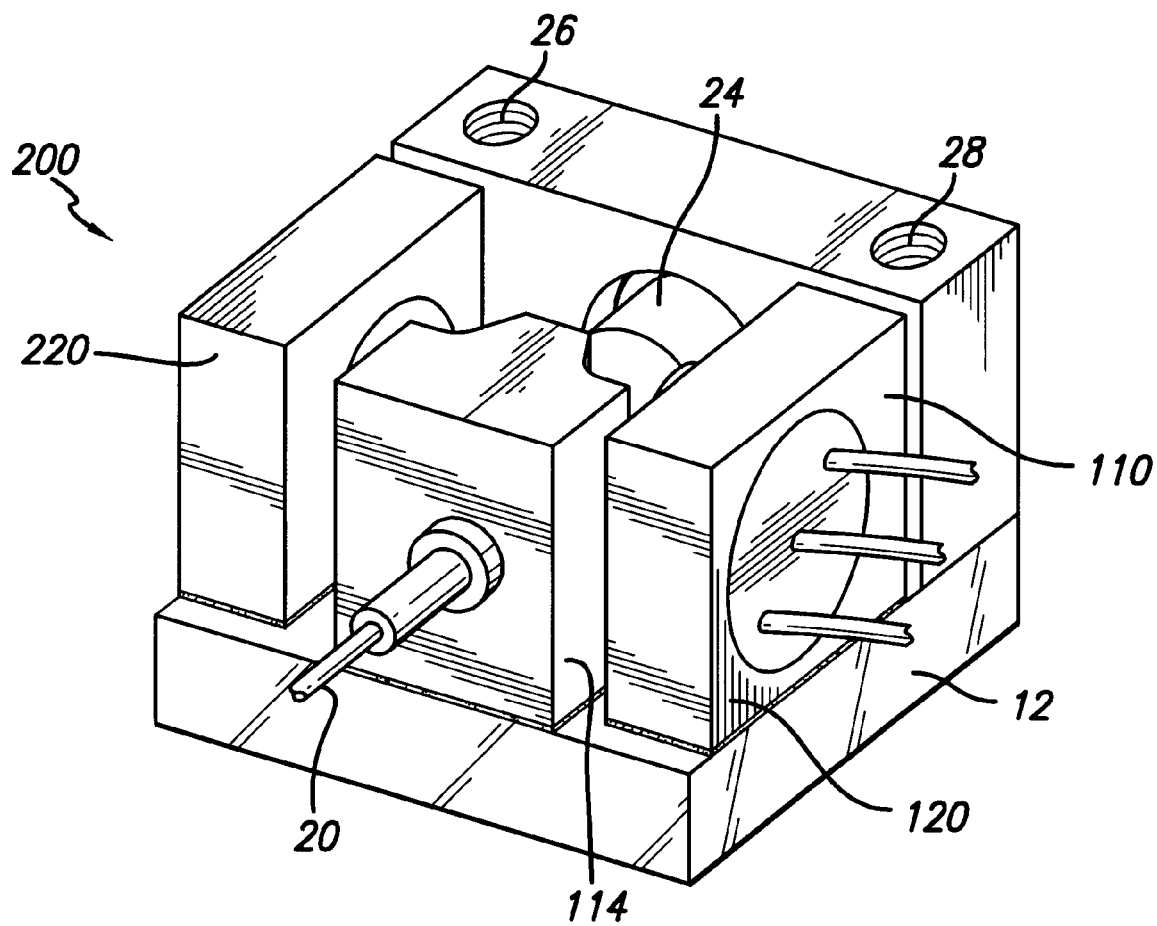
FIGS. 6A–6D are perspective and sectional views, respectively, of an optical assembly in accordance with a third preferred embodiment of the present invention.
Figure 6C:
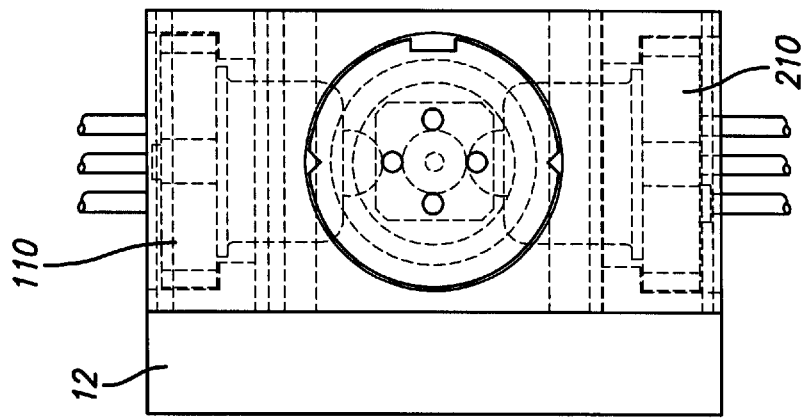
Figure 6B:
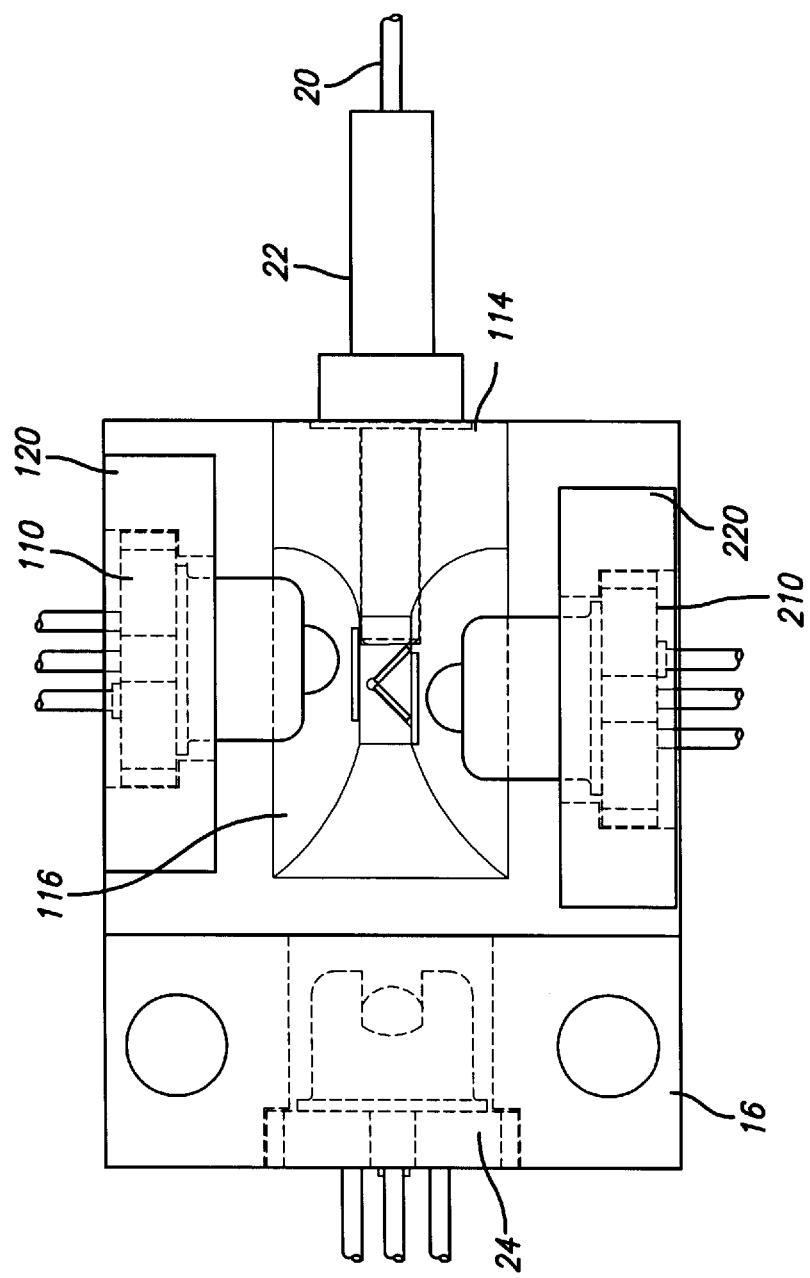
Figure 6D:
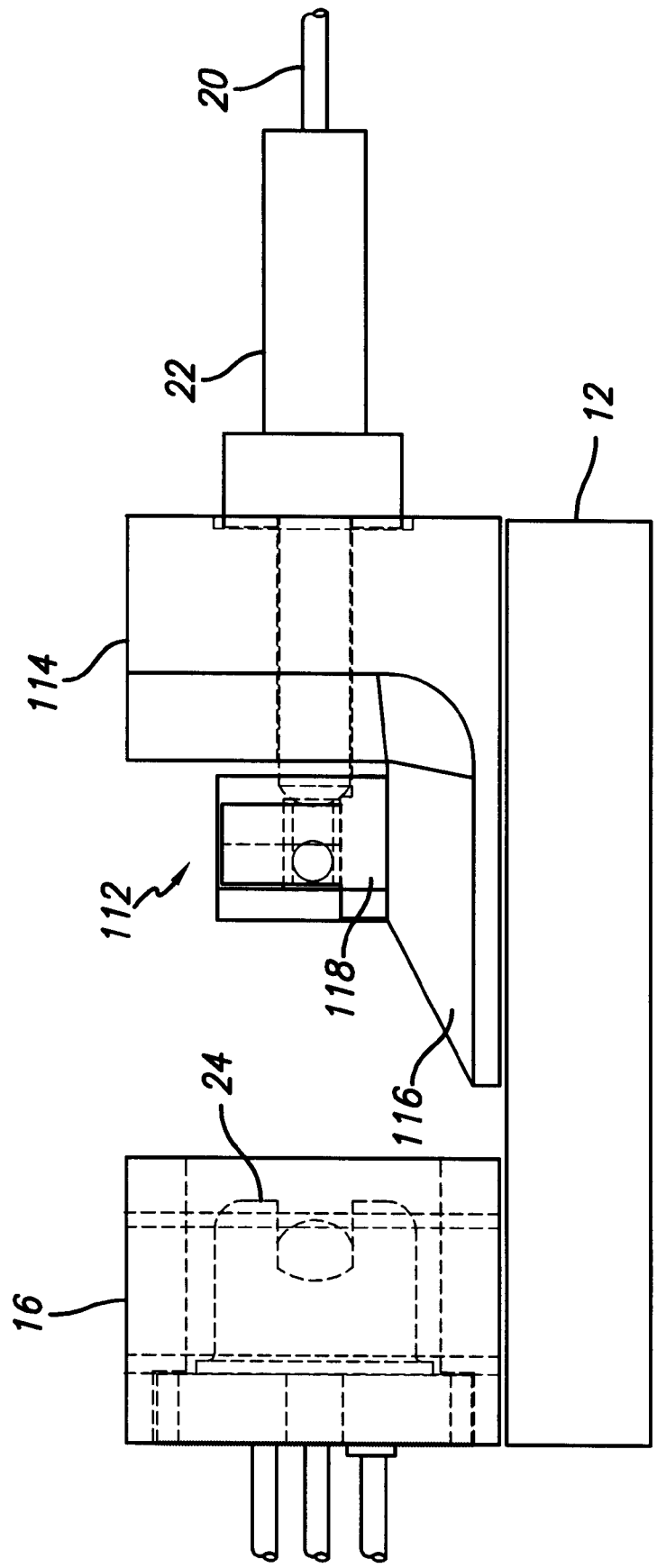

Referring to FIGS. 5A and 5B, an alternate embodiment of the optical fiber holder 114 is illustrated having a modified embodiment passive optics holder 118. In the embodiment of FIGS. 5A and 5B, platform 116 of the previously described embodiment is replaced with a modified passive optics holder 118 having extensions 130 and 132 for engaging the fiber optic holder and suspending the passive optics in the optical path. The extensions 130 and 132 engage matching slots 134 and 136 in the fiber optic holder 114 and the may be secured therein through any of a number of known techniques such as epoxy bonding, laser welding, or other known techniques. As in the case of the previously described embodiment the passive optics holder and mounting technique is designed to facilitate the alignment and assembly of the passive optics relative to the optical fiber. It will be appreciated by those skilled in the art that other configurations are equally possible to provide the desired relation between the optical fiber and passive optical components and may vary with the particular optical components and configuration adopted for the overall assembly.

Referring to FIGS. 6A–6D, a third embodiment of the optical assembly of the present invention is illustrated employing four optical components, for example, three active optical components and an optical fiber, in a single compact optical assembly.

In the optical assembly 200 of FIGS. 6A–6D the optical fiber, first active optical component, second active optical component and the substrate may generally correspond to the previously described embodiments and the discussion thereof applies to the present embodiment as well and is incorporated by reference. Accordingly, like numerals will be employed and a detailed discussion of these elements will not be provided for brevity.

The assembly 200 differs from the preceding embodiment by the addition of a fourth optical component which may be a third active optical component 210 in a preferred embodiment for an optical networking application. Third active optical component may be any of a variety of known active optical components such as of the type described above in relation to active optical component 24. As examples, and without limitation, active optical component 210 may comprise a photodetector, a photodetector and built-in amplifier combination, such as a combined photodetector and cable TV amplifier or PIN-TIA combination, or other known active optical component. Also for convenience of manufacturing and assembly with commercially available components, the third active optical component 210 may preferably be provided in a conventional package such as a cylindrical TO can and the third active optical component holder 220 is preferably configured with an opening adapted to receive such a conventional component. The component holder 220 is dimensioned so as to place the third active optical component at the correct distance from the substrate 12 so as to be optically aligned with the optical axes of the optical fiber 20 and the first and second active optical components 24 and 110. If the third active optical component 210 is a significant heat generating component, then the holder 220 may be provided with mounting holes similar to holes 26 and 28 to thermally couple the holder 220 to a housing or heat sink as described in relation to the holder 16 in the previously described embodiment. Also for reasons described previously, holder 220 preferably has a relatively low coefficient of thermal expansion which also substantially matches that of substrate 12. Furthermore, it will be appreciated that the holder 220 is preferably affixed to the substrate 12 by the use of a radiation curable adhesive, for example, a UV curable adhesive as described previously may be employed, and has a flat or slightly curved lower surface for contacting the flat upper surface of substrate 12.

As in the case of the previous embodiment, passive optics 112 are preferably provided to direct the light beam to the various optical components. These passive optics may be provided in a holder 118 or mounted directly on extension 116 of fiber optic holder 114, as described previously. If provided in a holder 118, such holder may be mounted to the fiber holder or directly on substrate 12. The choice of passive optical components and their configuration, both relative to each other and the fiber, may be selected for the specific implementation using criteria well known in the art. For example, the relative configuration is chosen generally to avoid undesired reflections as is well known in the art.

Figure 7:
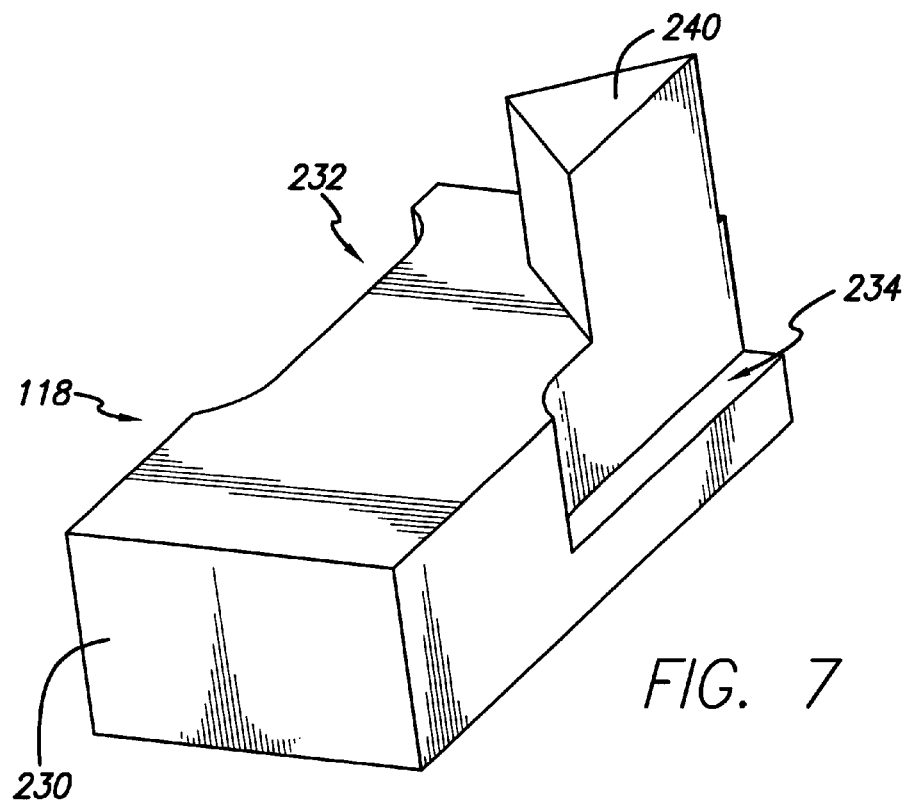
FIG. 7 is a perspective view of a passive optics holder in accordance with a preferred embodiment of the present invention.
Figure 8:
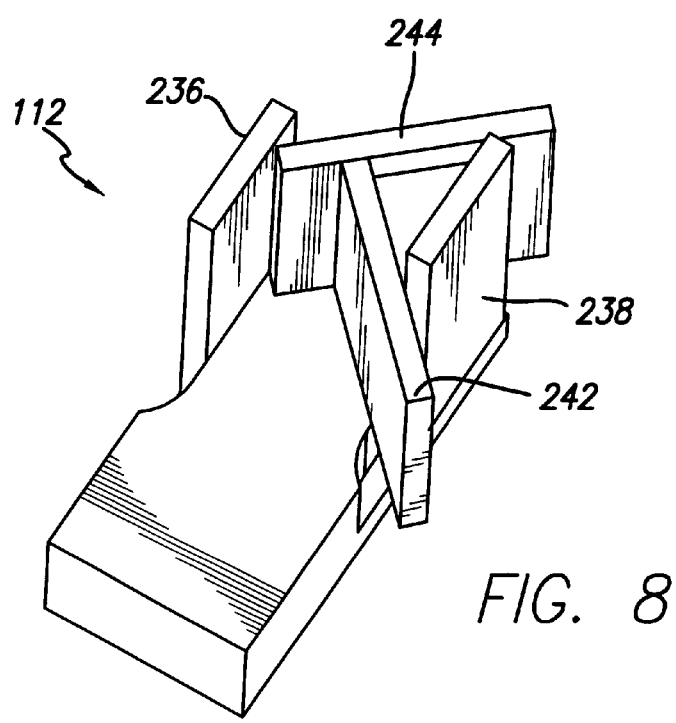
FIG. 8 is a perspective view of a passive optics assembly in accordance with a preferred embodiment of the present invention.

Referring to FIGS. 7 and 8, a preferred embodiment of the passive optics holder 118 and the passive optics assembly 112 are illustrated, respectively. As shown, the passive optics holder 118 may comprise a block 230 of a suitable rigid material having a coefficient of thermal expansion matching the fiber optic component holder 114. The passive optics holder 118 preferably has a flat upper surface and includes mounting and alignment recesses 232 and 234 for receiving optical filters 236 and 238 therein. A wedge shaped extension 240 in turn is provided which has first and second angled flat surfaces for receiving and aligning beam splitters 242 and 246. The wedge and recess locations are configured such the beam of light is directed to the active optical components and fiber with a minimum of undesired reflections and beam loss. The specific optical filters and beam splitters employed will vary with the particular application and may be conventional in nature. The bottom surface of block 230 preferably its flat to engage the upper flat surface of extension 116 of the fiber optic component holder 114. Alternatively, if the passive optics holder 118 is adapted for mounting directly on the substrate 12, the block 230 may preferably be flat or slightly curved to mate with the upper flat surface of the substrate 12, for reasons described in relation to the other optical component holders. In such embodiment the holder 118 preferably will be mounted to substrate 12 via a radiation curable adhesive on the bottom surface thereof. Alternatively, the alignment configuration recesses and surfaces of holder 118 in FIG. 7 may be incorporated in the platform 116 of the fiber holder described previously in an embodiment where the passive optics are mounted directly on the fiber holder.

The passive optics assembly may be mounted on the active optical component holder 16 instead of the fiber holder and the holder 16 may be modified accordingly. Also, the passive optical components may be split into two separate assemblies with one mounted on the fiber holder and one mounted on the active optical component holder. Alternatively, one passive optical component assembly may be mounted on the substrate and the other on holder 114 or 16.

The particular illustrated passive optics in FIG. 8 correspond to suitable passive optics for a three active component embodiment of the optical assembly such as described in relation to FIGS. 6A–6D. One specific implementation of the optics for such a three active component embodiment will be described below in relation to FIG. 9. For an embodiment with two active components such as described in relation to FIGS. 4A and 4B, however, a single beam splitter and single optical filter may be employed and the corresponding modifications in the passive optics holder 118 will be apparent to those skilled in the art. In such applications the configuration illustrated in FIG. 9 may correspond to a data diplexer or duplexer. Also, in various applications additional or different passive optical components may be provided on holder 118 and such modifications will also be apparent to those skilled in the art.

Figure 9:
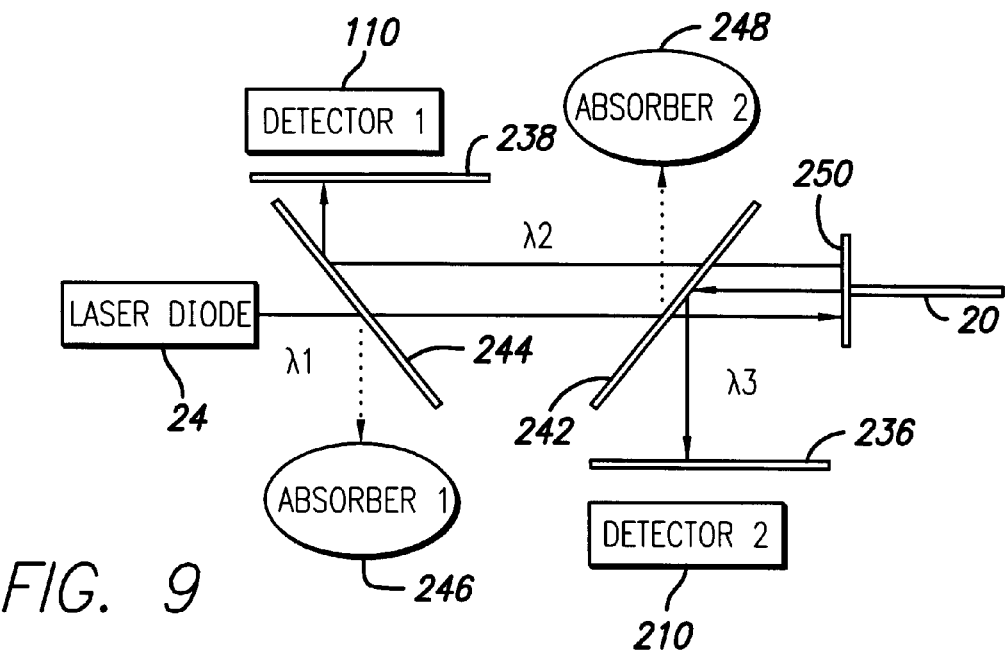
FIG. 9 is a schematic drawing of optics implemented in an optical assembly in accordance with the present invention.

Referring to FIG. 9, one preferred implementation of the optics for a four optical component embodiment corresponding to three active optical components and an optical fiber is illustrated in a schematic drawing. Like numerals for components described in the preceding embodiments will be employed for the optical components of FIG. 9. The specific implementation of FIG. 9 is suited for implementation as an optical networking unit and implementation in a fiber optic data distribution network is one preferred application thereof.

Referring to FIG. 9, a laser diode source 24 corresponds to a first active optical component and provides a laser light at a first wavelength $\lambda 1$. For example, and without limitation $\lambda 1$ may lie in the range of 1280–1380 nm. The light provided by the laser diode 24 will be modulated with data and provided to the optical fiber 20 for transmission along the fiber optic network as shown by the first beam path. Modulated laser light at a second wavelength $\lambda 2$ in turn is received into the optical networking unit from optical fiber 20, as indicated by the second beam path, and passed to the first photodetector 110 corresponding to the second active optical component in the assembly described above. This incoming light is directed to the detector 110 by beam splitter 244. For example, and without limitation $\lambda 2$ may lie in the range of 1440–1500 nm. Beam splitter 244 may be for example a dichroic beam splitter of a type well known to those skilled in the art. Light at other wavelengths than $\lambda 2$ are blocked from detector 110 by filter 238. A third wavelength of laser light $\lambda 3$ may also be received from the optical fiber 20 and provided to a second photodetector 210, corresponding to the third active optical component in the assembly described above. For example, and without limitation $\lambda 3$ may lie in the range of 1520–1600 nm. This third wavelength of light is provided to detector 210 by second beam splitter 242. Beam splitter 242 may also be for example a dichroic beam splitter of a type well known to those skilled in the art. The other wavelengths of light present in the optical assembly are blocked by second filter 236. To minimize the undesired detection of filtered wavelengths by other detectors due to internal reflections inside the assembly, first and second optical absorbers 246, 248 may be provided as indicated in FIG. 9. The optical absorbers may comprise antireflective or absorptive coatings on appropriate inner surfaces of the optical component holders and/or the housing of the optical assembly at locations where the light may be directed from the beam splitters. Also, an antireflective coating 250 may be provided on the surface of optical fiber 20 as schematically illustrated in FIG. 9.

Figure 10:
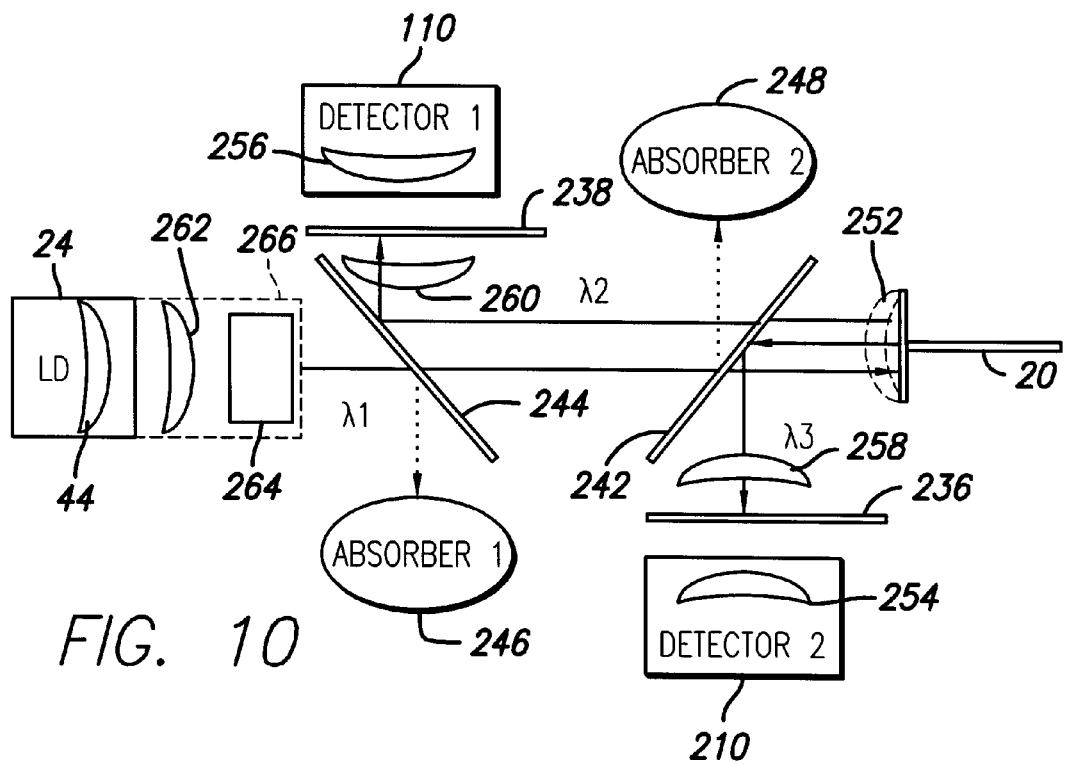
FIG. 10 is a schematic drawing of optics implemented in an optical assembly in accordance with the present invention as shown in FIG. 9 further illustrating various configurations of passive optical components.
Figure 11:
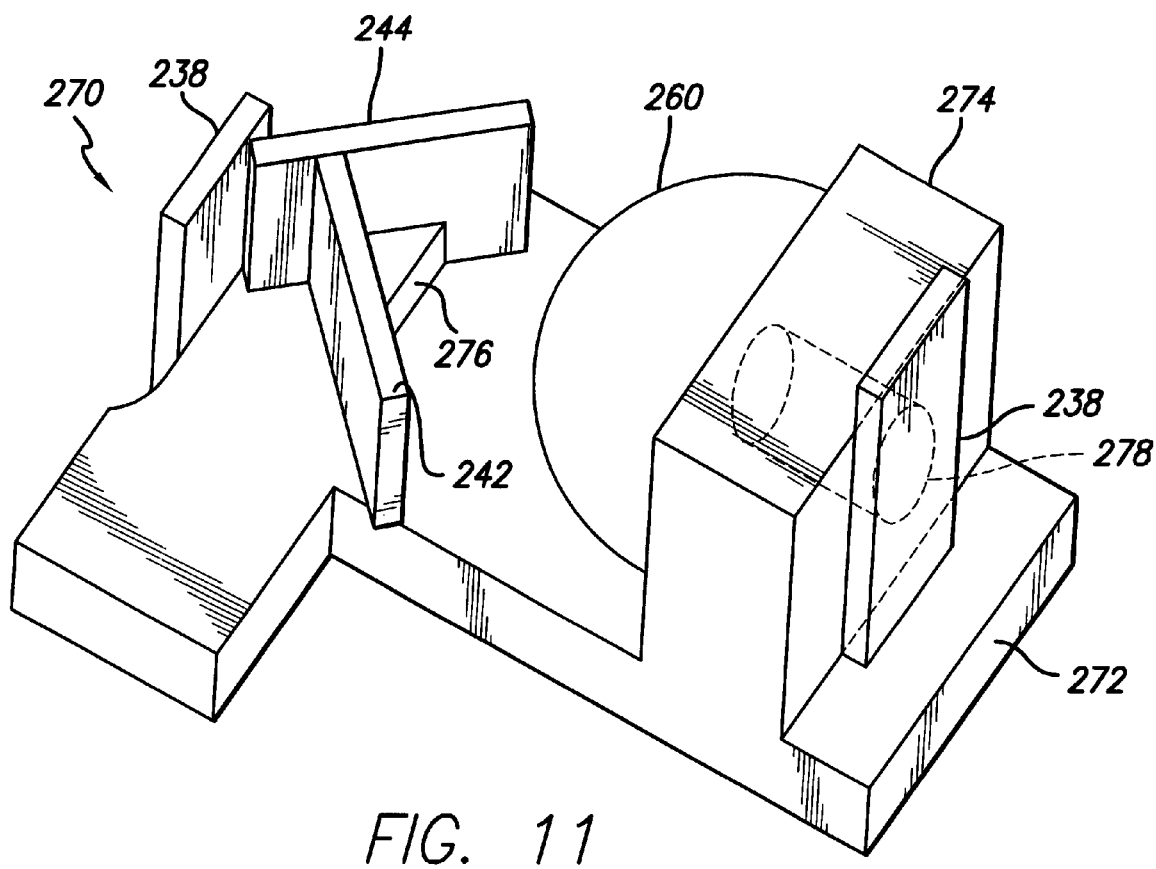
FIG. 11 is a perspective view of a passive optics assembly incorporating a lens, in accordance with an alternate embodiment of the present invention.

Referring to FIG. 10, the optical assembly of FIG. 9 is illustrated with various additional configurations of passive optical elements which may be provided in the implementation of the optics of FIG. 9. For example, lenses may be provided in various configurations in the optical assembly. For example, suitable lenses can be GRIN, ball, aspheric, etc. In FIG. 10 two possible lens configurations are illustrated for each active optical element, on opposite sides of the corresponding filter. The mounting approach adopted for the lenses may also be varied, for example, the lenses may be part of the active optical component package, mounted on the component holders, or mounted on one or more passive optical component holders in the beam path. The passive optical component holder or holders in turn may be mounted on the fiber holder, active component holder or directly on the substrate. A suitable passive optical component holder which may incorporate a lens is illustrated in FIG. 11 described below.

Referring more specifically to the configuration of passive optical components illustrated in FIG. 10, optical fiber may have a lens 252 which may be affixed to the end of the ferrule, mounted to the fiber holder, or mounted on a passive optical component holder. The passive optical component holder in turn may be mounted on the fiber holder or directly on the substrate. Laser diode 24 also has an associated lens which may be incorporated in the diode package as lens 44 as has been described previously or may be configured on the laser diode holder or on a passive optical component holder, as indicated by lens 262. The passive optical component holder may be mounted on the fiber holder as described previously or on the laser diode holder as illustrated by passive optical component holder 266 in FIG. 10. The passive optical component holder 266 may also be mounted directly on the substrate. Holder 266 may be a common holder incorporating some or all of the other passive optical components or may be a separate holder incorporating lens 262 and/or selected other passive optical components. As also illustrated in FIG. 10 an optical isolator 264 may be provided in the beam path of laser diode 24. Optical isolator may be mounted on holder 266 or directly on the laser diode holder.

As further illustrated in FIG. 10, a lens 256 or 260 is associated with first photodetector 110, corresponding to the second active optical component in the assembly described above. Lens 256 is configured on the photodetector side of the filter 238 whereas lens 260 is on the opposite side of the filter. The selection of the position of the lens may depend on a variety of factors including the specific application, cost and space constraints, and the component packaging. Lens 256 may be incorporated in the photodetector package, mounted on the photodetector holder or on a passive component holder. Lens 260 may preferably be mounted on a passive component holder. The configuration with lens 260 may incorporate filter 238 in the photodetector package or on the passive component holder.

As further illustrated in FIG. 10, a lens 254 or 258 is associated with second photodetector 210, corresponding to the third active optical component in the assembly described above. Lens 254 is configured on the photodetector side of the filter 236 whereas lens 258 is on the opposite side of the filter. As in the case of the lens associated with the first photodetector, the selection of the position of the lens may depend on a variety of factors including the specific application, cost and space constraints, and the component packaging, however, the selection need not be the same for the two photodetectors. Lens 254 similarly may be incorporated in the photodetector package, mounted on the photodetector holder or on a passive component holder. Lens 258 may also preferably be mounted on the passive component holder and filter 238 may be incorporated in the photodetector package or mounted on the passive component holder.

It will be appreciated from comparison of the schematic drawings of FIGS. 9 and 10 with the preceding discussion of the preferred structural embodiments of the optical assembly of the present invention that a very compact implementation of the optical assembly of FIGS. 9 and 10 may be provided. The modular nature of the components enable easier configuration changes as compared with solid housing approaches. It will also be appreciated from the implementation of FIGS. 9 and 10 that the embodiment described previously with two active optical components and an optical fiber may effectively implement a bidirectional optical networking unit with a diode laser operating at a first wavelength $\lambda 1$ and a photodetector detecting a second wavelength $\lambda 2$, and such an optical networking unit is implied herein from FIGS. 9 and 10 (merely corresponding to the absence of second detector 210 and associated passive optics in the figures). Also, one active optical component, either a laser or photodetector, operating at a wavelength $\lambda 1$ and an optical fiber may equally be very effectively implemented in the compact assembly of the present invention and such an optical networking unit is also implied herein. Also, it should be appreciated that in some applications two or more of $\lambda 1$, $\lambda 2$, and $\lambda 3$ may be equal. In such embodiments the corresponding beam splitter will be a power splitting beam splitter as known in the art. Also, it should be appreciated that implementing the optical assembly for a particular application and particular selection of optics may involve a variety of modifications from the preceding preferred embodiments and such modifications are within the spirit and scope of the present invention.

Referring to FIG. 11 a passive optics assembly 270 incorporating a lens, in accordance with an alternate embodiment of the present invention is illustrated in a perspective view. The passive optics assembly of FIG. 11 may be advantageously employed with a configuration having a lens on the opposite side of a filter from a photodetector, or other active optical component, such as described above in relation to FIG. 10. To illustrate such a correspondence, filter 238 and lens 260 in FIG. 11 are given the same reference numerals as in FIG. 10. Nonetheless it should be appreciated that the assembly of FIG. 11 may also be employed for lens 258, 262 or 252 described in FIG. 10, or for a combination of two or more of these lenses.

As in the case of the embodiment of FIG. 8, the passive optics assembly 270 may comprise a block 272 of a suitable rigid material having a coefficient of thermal expansion matching the component holder to which it will be mounted. The block 272 preferably has a flat upper surface and includes a mounting and alignment recess for receiving optical filter 238 therein. A wedge shaped extension 276 in turn is provided which has first and second angled flat surfaces for receiving and aligning beam splitters 242 and 244. The bottom surface of block 272 preferably is configured to engage the active optical component to which it is mounted. Alternatively, if the passive optics assembly 272 is adapted for mounting directly on the substrate 12, the block 272 may preferably be flat or slightly curved and may be textured or roughened to enable an improved adhesive bond to mate with the upper flat surface of the substrate 12, for reasons described in relation to the other optical component holders. In such embodiment the block 272 preferably will be mounted to substrate 12 via a radiation curable adhesive on the bottom surface thereof. A lens mounting extension 274, preferably integrally formed as part of block 272, is also provided. A front surface thereof receives lens 260 which may be epoxy bonded or otherwise affixed to extension 274. A cylindrical opening 278 is provided in extension 274 to allow the laser light therethrough. A rear surface of extension 274 may receive filter 238 aligned with the circular opening 278. Alternatively, filter 238 may be incorporated in the photodetector package or may be mounted on the photodetector holder. A variety of modifications of the assembly 270, such as to add additional lenses, may be made and will be apparent to those skilled in the art.

Figure 12:
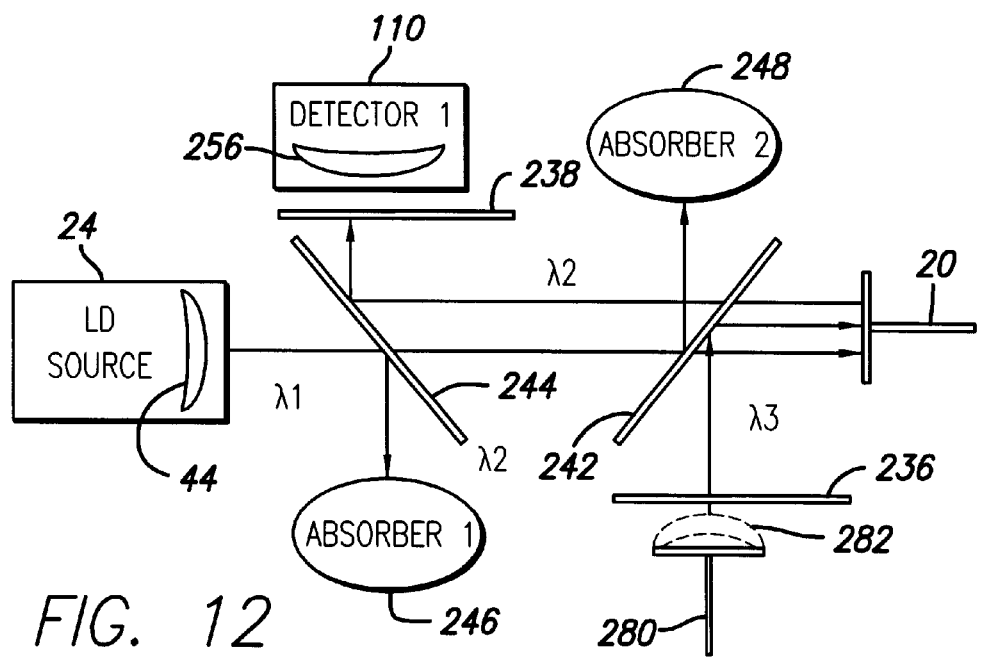
FIG. 12 is a schematic drawing of an optical assembly employing two fibers in accordance with another alternate embodiment of the present invention.

Referring to FIG. 12, a schematic drawing of an optical assembly employing two fibers in accordance with another alternate embodiment of the present invention is illustrated. As in the embodiment of FIG. 9, a laser diode source 24 provides laser light at a first wavelength λ1. For example, and without limitation λ1 may lie in the range of 1250–1380 nm. Laser diode 24 may incorporate a lens 44 as illustrated, or alternate lens configurations such as discussed above may be provided. The light provided by the laser diode 24 will be modulated with data and provided to the optical fiber 20 for transmission along the fiber optic network as shown by the first beam path. Modulated laser light at a second wavelength λ2 in turn is received into the optical networking unit from optical fiber 20, as indicated by the second beam path, and passed to photodetector 110. Photodetector 110 may include lens 256 or the other lens configurations described above may be provided. The incoming light from fiber 20 is directed to the detector 110 by beam splitter 244. For example, and without limitation λ2 may lie in the range of 1440–1500 nm. Light at other wavelengths than λ2 are blocked from detector 110 by filter 238. A third wavelength of laser light λ3 may also be received from a second optical fiber 280 and provided to first optical fiber 20. For example, and without limitation λ3 may lie in the range of 1520–1600 nm. This third wavelength of light is provided to optical fiber 20 by second beam splitter 242. Fiber 280 may include a lens 282 and a lens may similarly be provided on fiber 20 as has been described in previous embodiments. The other wavelengths of light present in the light transmitted by optical fiber 20 and LD source 24 scattered on beam splitter 242 or other stray light in the unit are blocked by second filter 236. To minimize the undesired detection or transmission of filtered wavelengths due to internal reflections inside the assembly, first and second optical absorbers 246, 248 may be provided. The optical absorbers may comprise antireflective or absorptive coatings on appropriate inner surfaces of the optical component holders and/or the housing of the optical assembly at locations where the light may be directed from the beam splitters. Also, an antireflective coating 250 may be provided on the surface of optical fiber 20 and/or fiber 280.

It should be appreciated that a variety of modifications to the optical configurations illustrated in FIGS. 9, 10 and 12 are possible within the scope of the present invention. For example, although four optical components are illustrated additional optical components may be added, along with beam splitters, in a cascaded manner which is apparent from the illustrated embodiments. Various combinations of active optical components and fibers are possible in such additional embodiments. Various additional passive optical components including lenses, beam splitters, filters, prisms, and optical isolators may also be provided.

Figure 13A:
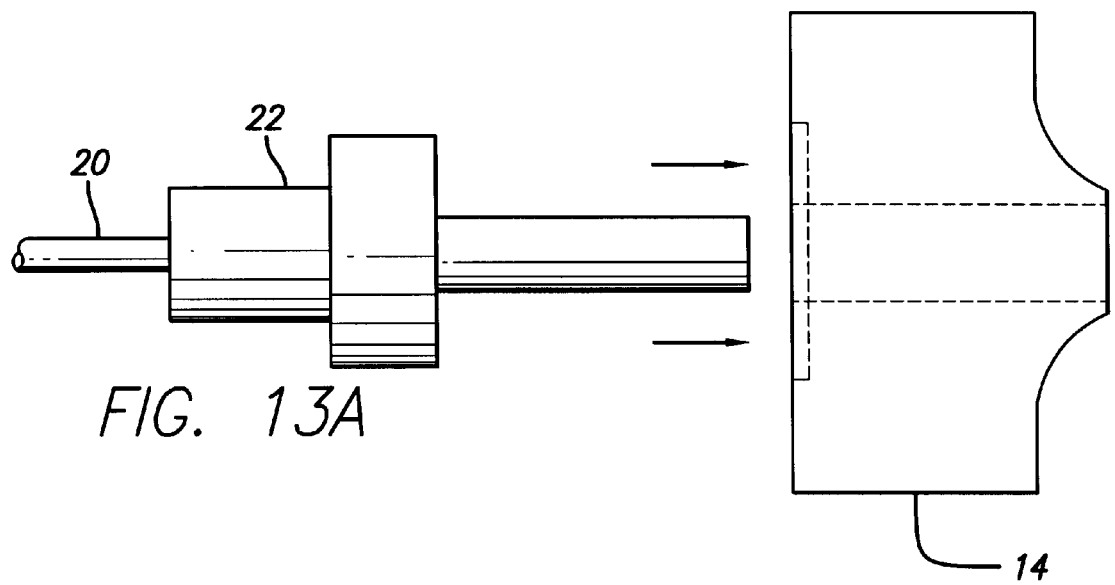
FIGS. 13A–13H are structural drawings illustrating an assembly method in accordance with a preferred embodiment of the present invention.
Figure 13B:
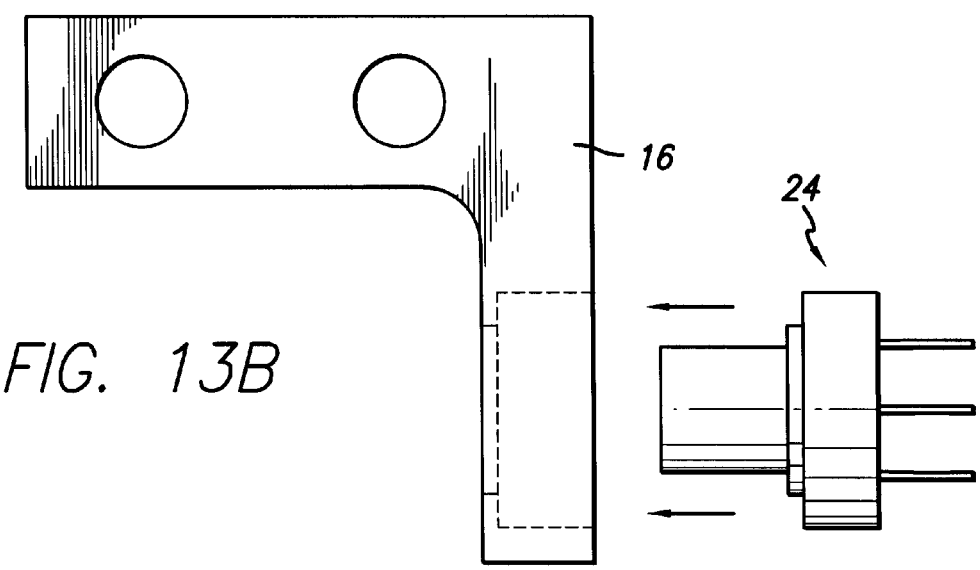
Figure 13C:
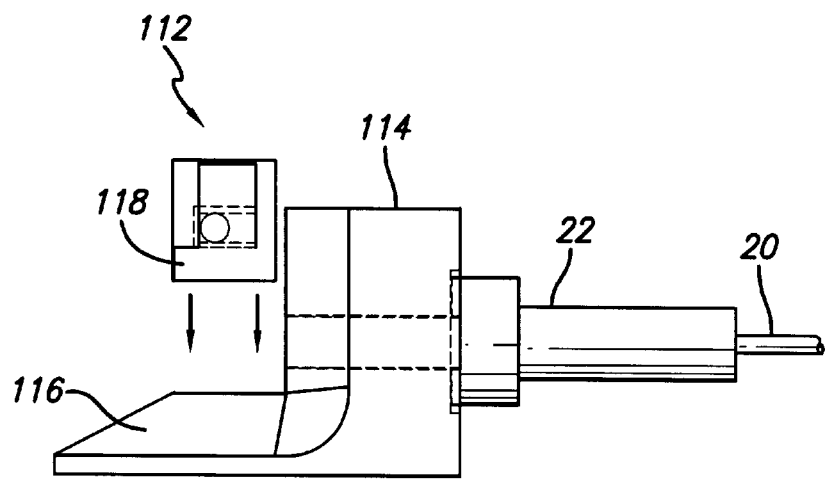

Referring to FIGS. 13A–13H and 14 a preferred embodiment of a method of assembly of an optical package in accordance with the present invention is illustrated. As illustrated, a first act 300 in the method of present invention is the assembly of the optical components in their respective holders and the securing of the components in place in the holders. This is illustrated in FIG. 13A for the assembly of an optical fiber 20 and ferrule 22 in holder 14 and in FIG. 13B for the assembly of an active optical component 24 with its corresponding holder 16. As shown, the act of inserting and securing the optical component in the corresponding holder may simply comprise inserting the component in the corresponding matching opening which is dimensioned so as to provide a relatively close fit with the optical component. That is, in one embodiment, the securing of the component to the holder may simply be provided by a press fit to the holder. Otherwise, the inserting of the optical component into the holder is followed by a bonding or other securing act such as laser welding, epoxy bonding or other known technique for securing such components. If angled termination of the fiber is required the polishing can take place after insertion and securing the ferrule 22 inside the holder 14. Where passive optical components are to be provided on the optical fiber holder, the passive optics are first secured in the passive optics holder and then the holder is positioned on the extension of the optical fiber holder as illustrated in FIG. 13C. The passive optics holder is then secured through bonding, laser welding or other known technique. Alternatively, the passive optics is positioned and secured directly on the fiber optic holder, e.g., on a platform 116.

This assembling and securing the optical components with the corresponding holder is repeated for as many active or passive optical components as are present in the final assembly.

Figure 13D:
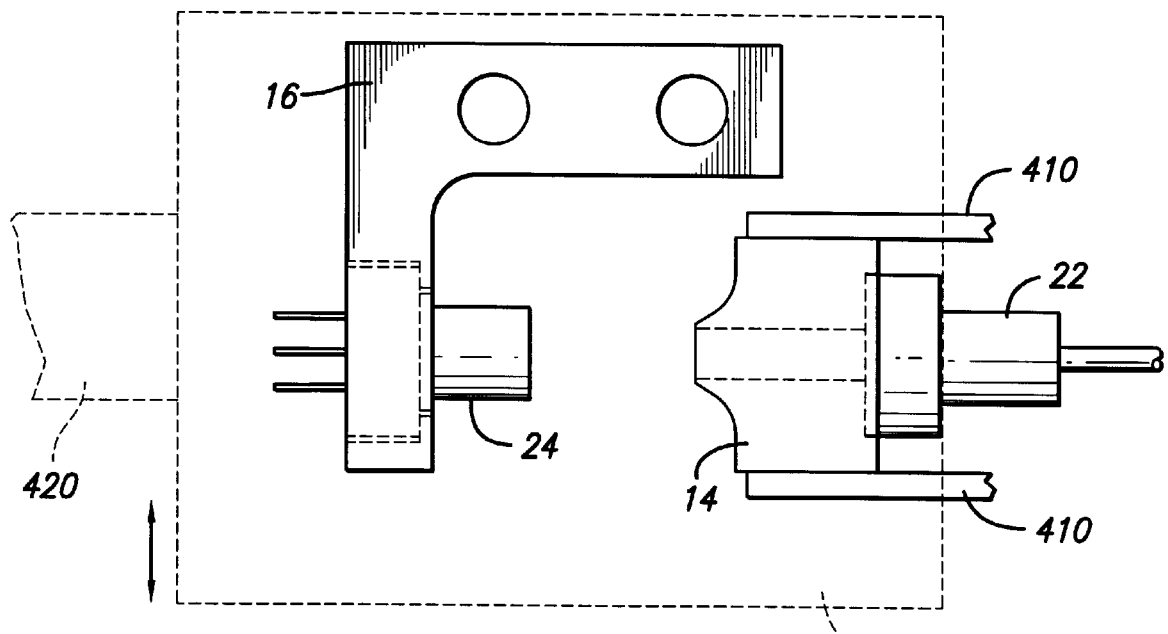

The next act 310 in the method of the present invention comprises preconfiguring the optical components and holders on an alignment platform or other suitable alignment fixture. This is illustrated in FIG. 13D in a top view which illustrates active optical component holder 16 configured on an alignment platform 400 with optical fiber holder 14 held in a fixed position by a suitable fixture 410, illustrated by opposed gripping arms 410 in FIG. 13D. As illustrated by the arrows in FIG. 13D the alignment platform 400 is movable relative to the fixture 410 and is coupled to an appropriate positioning machine via arm 420. For example, a suitable positioning machine is commercially available from Burleigh Instruments, Inc., model Freedom 1000. Preferably platform 400 is movable in at least one direction but preferably additional degrees of movement are also provided. For example, two, three, four, five or six degrees of freedom positioning may be provided. This may include pivoting degrees of motion for the platform as well as motion in the plane and perpendicular to the plane of the view of FIG. 13D. The optical elements are preconfigured relative to each other on the platform 400 and the grips 410 so that the optical axis of the two elements are approximately in alignment. For example, this may be done manually or by moving the alignment platform 400 to a preset position.

The next act 320 in the method of the present invention involves more precisely aligning the optical components while the components are active. For example, if the active component 24 is a diode laser and the other optical component an optical fiber, the laser may be coupled to a predetermined data/modulation source and the output from the optical fiber monitored as the alignment platform 400 is adjusted. When the output from the optical fiber shows optimal coupling between the laser and the fiber the alignment is complete. Similarly, if the active optical component is a detector, then an input modulated laser beam may be directed into the optical fiber and the output from the detector monitored. Again, the platform 400 may be adjusted to alter the alignment of the two optical components until an optimal output from the detector is provided.

Figure 13E:
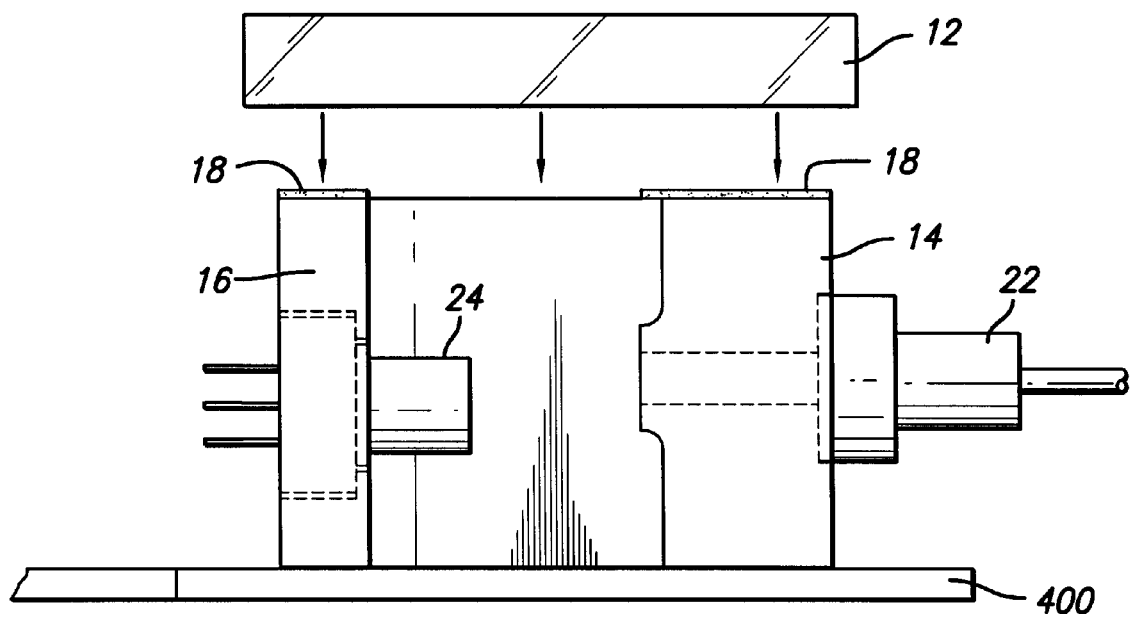

Once optimal alignment of the optical components is achieved, the next act 330 in the method of the present invention comprises placing the transparent substrate 12 onto the bottom surfaces of the optical components while maintaining the position of the component holders, as illustrated in FIG. 13E in a side view. As further illustrated in FIG. 13E, the bottom surfaces of the optical component holders are coated with a suitable radiation curable adhesive 18 prior to the placing of the substrate 12 onto the optical components. Depending on the curing properties of the adhesive it may be deposited immediately prior to the placing of the substrate 12 onto the components or may be provided earlier in the assembly process if exposure to air for a relatively prolonged period of time will not affect the curing properties of the adhesive. Alternatively, the adhesive may be placed on the substrate at the approximate location of the component holders prior to lowering the substrate onto the holders.

Figure 13F:
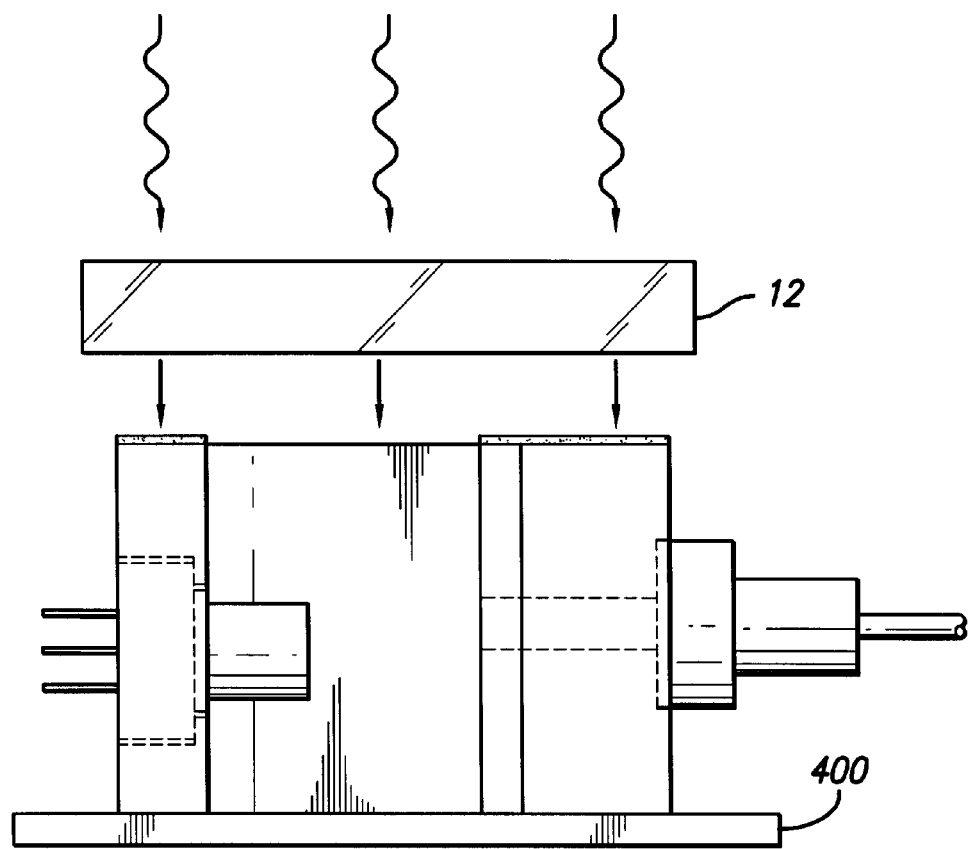

The next act 340 in the method of the present invention comprises exposure of the radiation curable adhesive with radiation through the transparent substrate while the optical components are maintained in their correctly aligned position. This act of the method of the present invention is illustrated in FIG. 13F in a side view. More specifically, this act of curing the adhesive by exposure through the transparent substrate preferably comprises exposing the UV curable adhesive to UV radiation and preferably the adhesive comprises a relatively low coefficient thermal expansion adhesive having low curing shrinkage. As result, the amount of distortion of the alignment of the optical components will be minimized during the curing process. As result, after the curing process is completed the optical components will be secured to the substrate 12 in their correctly aligned position.

The above described acts 300, 310, 320, and 340 are repeated for those additional optical components to be provided in the final optical assembly. For example, one or two additional active optical components may be provided in an optimized alignment relative to an optical fiber by repeating the above described acts of preconfiguring the optical component relative to the fiber, optimizing the alignment of the optical component to the fiber by monitoring an output of the component while the optical component is active, and exposing adhesive on the bottom of the optical component holder with radiation provided through the transparent substrate to cure the adhesive and fix the optical component holder in place. Once these acts are completed for all of the optical components of the assembly the optical alignment of the assembly will be optimized.

Figure 13G:
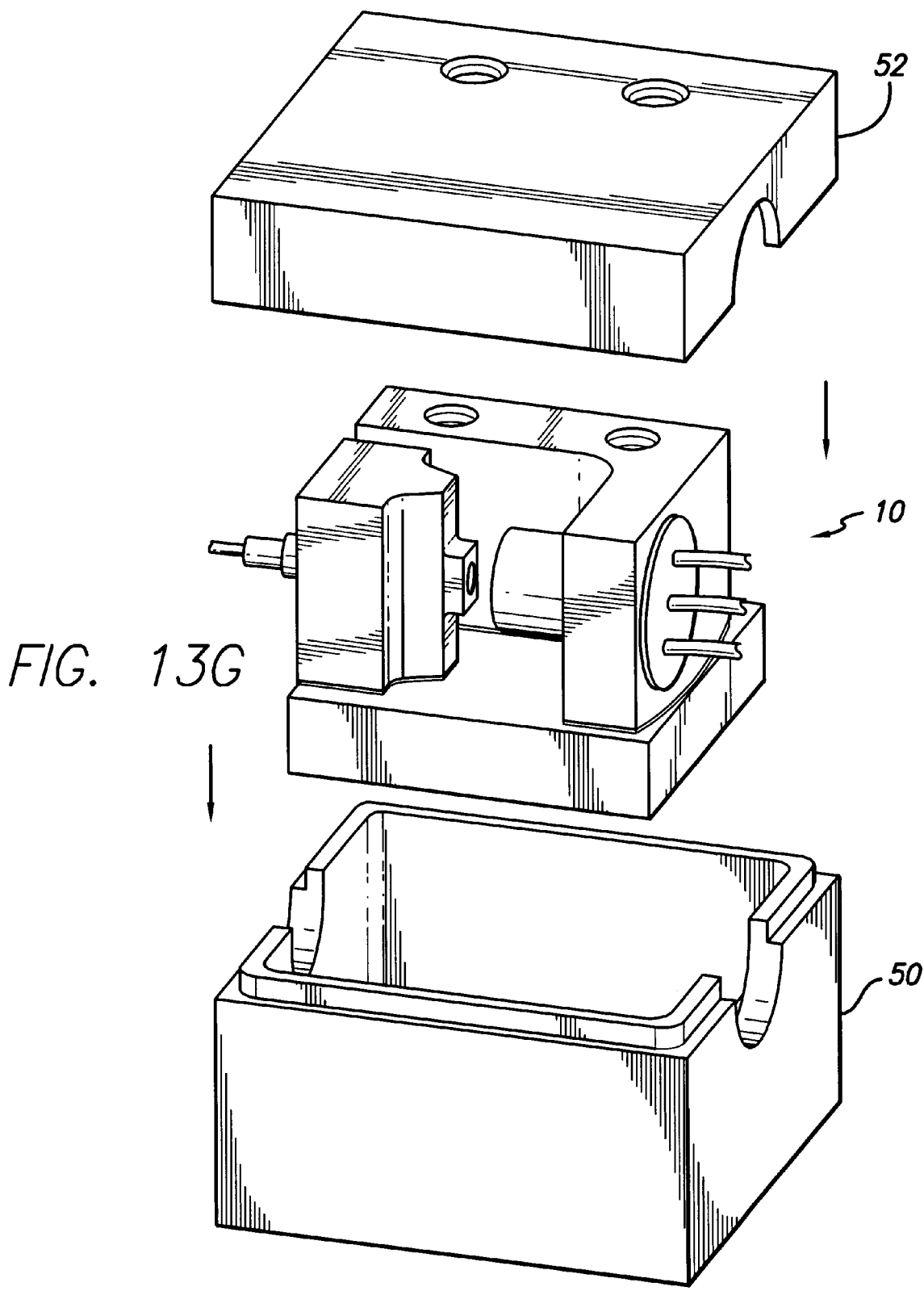
Figure 13H:
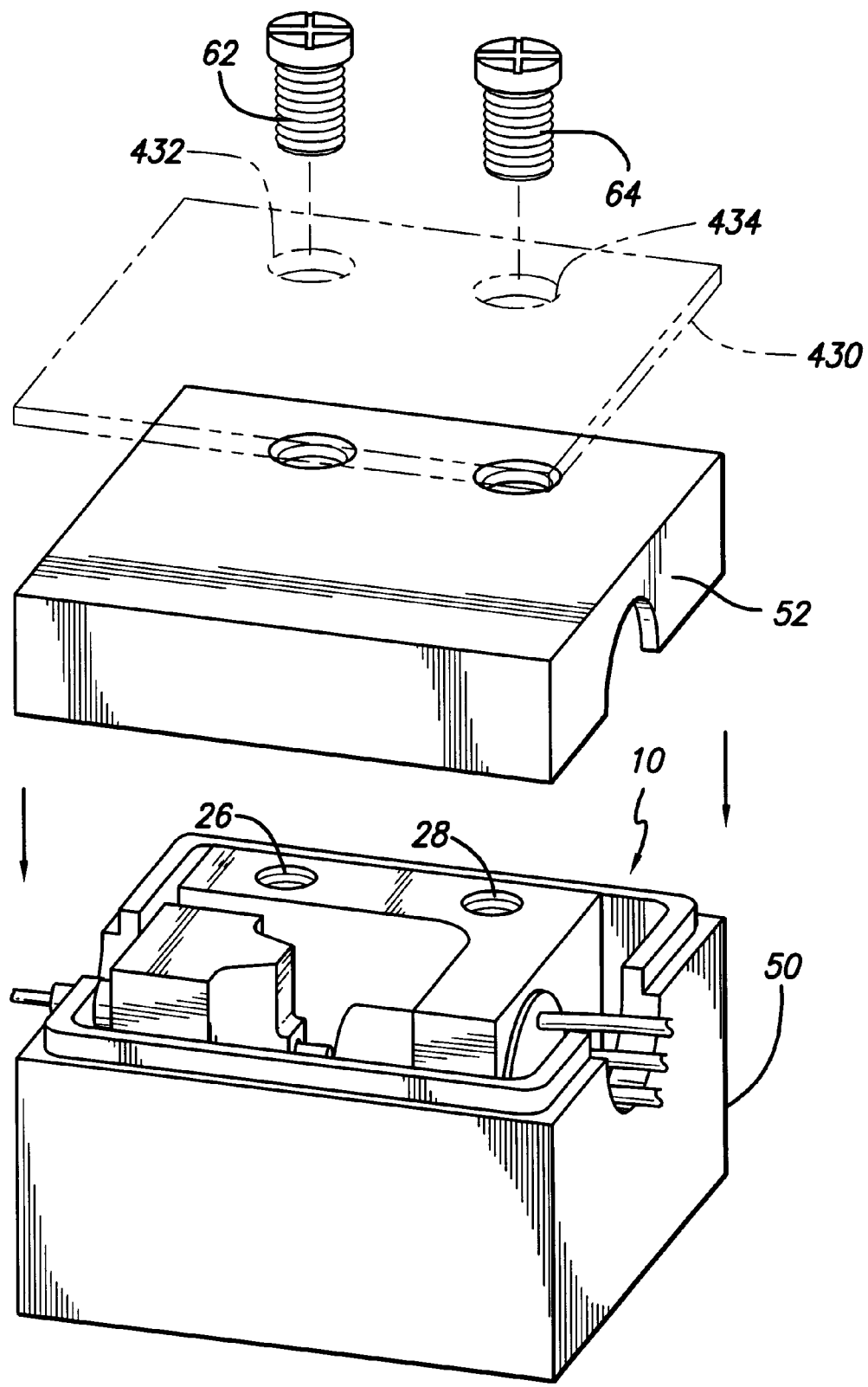
Figure 14:
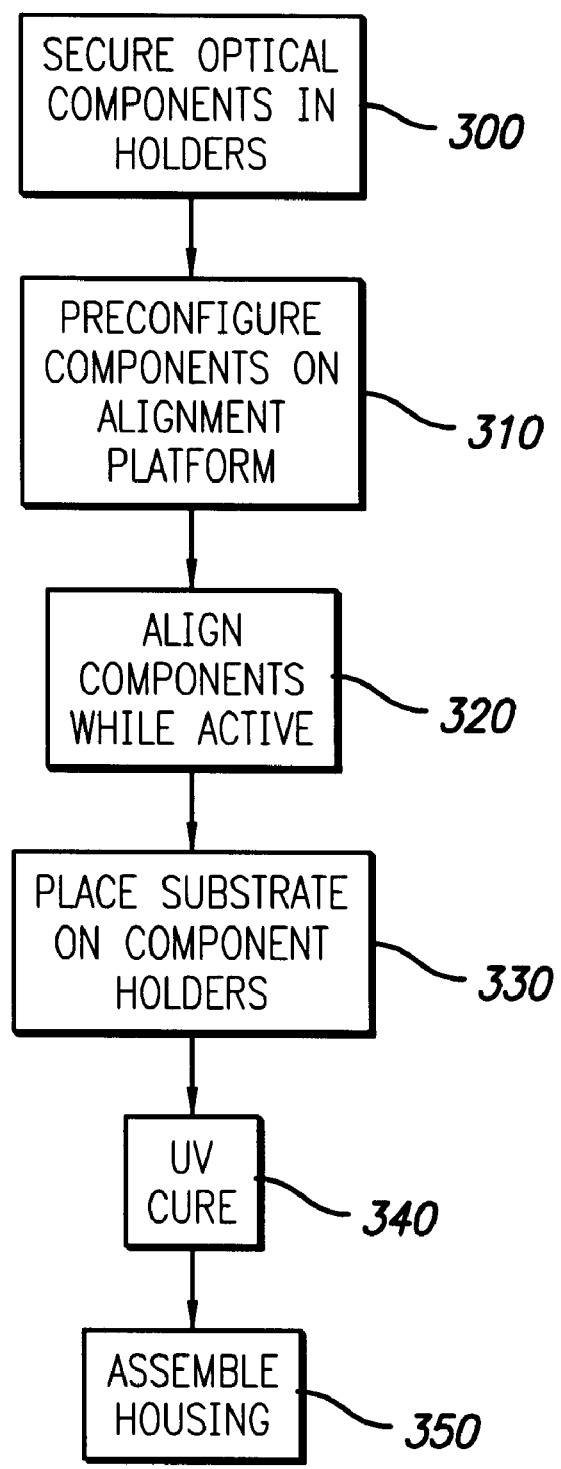
FIG. 14 is a process flow diagram illustrating an assembly method in accordance with a preferred embodiment of the present invention.

The next act 350 of the method of the present invention comprises assembling the housing around the optical components mounted on the assembly as illustrated in FIG. 13G. If the housing and assembly are to be mounted on a circuit board or other mounting structure, the act of assembling the housing around the optical assembly may include securing the housing to the circuit board or other support 430 via mounting holes 432 and 434 as illustrated in FIG. 13H. The assembled housing may then be sealed if desired to prevent moisture or dirt from affecting the optics. Preferably the optical fiber and ferrule are not directly mechanically coupled to the housing to avoid mechanical stress from the housing to the fiber. Therefore, the hole in the housing surrounding the ferrule and fiber may be sealed with a soft sealant such as a silicone gel to avoid rigid coupling to the housing.

In view of the foregoing it will be appreciated that the present invention provides an optimized optical assembly, which provides a compact assembly of optical components which are optimized in their relationship relative to each other. It will be further appreciated the present invention provides a method for assembling the optical components into an optimized optical assembly which may be readily implemented in a cost-effective manner.

It should be appreciated that the foregoing description of the preferred embodiments of the present invention may be modified in a variety of different ways which should be apparent to those skilled in the art from the above teachings. Accordingly, the present invention should not be limited in any way to the illustrated embodiments as the present invention in its various aspects encompasses all such modifications and variations thereof which are too numerous to describe in specific detail herein.

What is claimed is:

1. An optical networking unit, comprising:
   a substrate at least a portion of which allows radiation in a frequency range therethrough;
   an optical fiber holder secured to said substrate;
   an optical fiber secured to said optical fiber holder;
   an active optical component holder secured to said substrate; and
   an active optical component secured to said active optical component holder and optically aligned wit said optical fiber;
   a beam splitter;
   a second active optical component holder secured to said substrate; and
   a second active optical element secured to said second active optical component holder;
   wherein at least one of said optical fiber holder and active optical component holder is secured to said substrate by a curable bonding material of a type curable in response to exposure to radiation in said frequency range; and
   wherein said second active optical component holder is secured to said substrate via a radiation curable bonding material.

2. An optical networking unit as set out in claim 1, wherein said radiation in a frequency range comprises UV light and wherein said curable bonding material comprises a UV light curable adhesive.

3. An optical networking unit as set out in claim 1, wherein said active optical component comprises a diode laser.

4. An optical networking unit as set out in claim 1, wherein said first active optical component is a diode laser and said second active optical component is a photodetector.

5. An optical networking unit as set out in claim 1, further comprising a third active optical component holder secured to said substrate and a third active optical element secured to said third active optical component holder and wherein said third active optical component holder is secured to said substrate via a radiation curable bonding material.

6. An optical networking unit as set out in claim 5, wherein said first active optical component is a diode laser and said second and third active optical components are first and second photodetectors.

7. An optical networking unit as set out in claim 1, further comprising one or more passive optical components.

8. An optical networking unit as set out in claim 1, wherein said first active optical component transmits or receives a first wavelength of light and wherein said optical fiber transmits or receives a second wavelength of light.

9. An optical networking unit as set out in claim 8, further comprising an optical filter configured in the optical path so as to direct only the second wavelength of light to said second active optical component.

10. An optical networking unit as set out in claim 6, wherein said laser diode provides a first wavelength of light and wherein said optical fiber provides a second and third wavelength of light.

11. An optical networking unit as set out in claim 10, further comprising a first beam splitter and a first optical filter configured in the optical path so as to direct only the second wavelength of light to said first photodetector and a second beam splitter and a second optical filter configured in the optical path so as to direct only the third wavelength of light to said second photodetector.

12. An optical networking unit as set out in claim 11, wherein said first beam splitter, first optical filter, second beam splitter and second optical filter are secured to said optical fiber holder or said active optical component holder.

13. An optical networking unit as set out in claim 12, further comprising a passive optical component holder and wherein said first beam splitter, first optical filter, second beam splitter and second optical filter are secured to said passive optical component holder and wherein said passive optical component holder is secured to said optical fiber holder or said active optical component holder.

14. An optical networking unit as set out in claim 1, further comprising a housing and wherein said substrate, said optical fiber, said active optical component and said holders are configured in said housing.

15. An optical networking unit as set out in claim 7, wherein said passive optical component comprises a lens.

16. An optical networking unit as set out in claim 15, wherein said lens comprises a GRIN, aspheric or ball lens.

17. An optical networking unit as set out in claim 15, wherein said lens is configured as part of said active optical component.

18. An optical networking unit as set out in claim 15, wherein said lens is mounted on said active optical component holder.

19. An optical networking unit as set out in claim 15, wherein said lens is mounted on said optical fiber holder.

20. An optical networking unit as set out in claim 15, wherein said lens is mounted on a passive optical component holder.

21. An optical networking unit as set out in claim 7, wherein said passive optical components comprise one or more of a beam splitter, filter, optical isolator, prism or lens.

22. An optical networking unit as set out in claim 7, wherein said passive optical components are secured to said optical fiber holder.

23. An optical networking unit as set out in claim 7, wherein said passive optical components are secured to said active optical component holder.

24. An optical networking unit as set out in claim 22, further comprising a passive optical component holder mounted on said optical fiber holder and wherein said passive optical components are mounted on said passive optical component holder.

25. An optical networking unit as set out in claim 23, further comprising a passive optical component holder mounted on said active optical component holder and wherein said passive optical components are mounted on said passive optical component holder.

* * * * *